(12) United States Patent
Ohara et al.

(10) Patent No.: US 8,567,678 B2
(45) Date of Patent: Oct. 29, 2013

(54) IMAGING DEVICE, METHOD OF PRODUCTION OF IMAGING DEVICE, AND INFORMATION CODE-READING DEVICE

(75) Inventors: Naoto Ohara, Tokyo (JP); Yusuke Hayashi, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 996 days.

(21) Appl. No.: 12/525,056

(22) PCT Filed: Jan. 30, 2008

(86) PCT No.: PCT/JP2008/051453
§ 371 (c)(1),
(2), (4) Date: Aug. 21, 2009

(87) PCT Pub. No.: WO2008/093752
PCT Pub. Date: Aug. 7, 2008

(65) Prior Publication Data
US 2010/0001071 A1    Jan. 7, 2010

(30) Foreign Application Priority Data

Jan. 30, 2007  (JP) ................................ 2007-020149
Jan. 30, 2007  (JP) ................................ 2007-020150
Jan. 30, 2007  (JP) ................................ 2007-020151
Jan. 29, 2008  (JP) ................................ 2008-017626
Jan. 29, 2008  (JP) ................................ 2008-017627

(51) Int. Cl.
*G06K 7/10*    (2006.01)

(52) U.S. Cl.
USPC ................. 235/454; 235/462.01; 235/462.43; 235/462.44; 235/462.45

(58) Field of Classification Search
USPC ................... 235/454, 462.01, 462.43–462.45
See application file for complete search history.

(56) References Cited

U.S. PATENT DOCUMENTS 3,739,089 A    6/1973    Latall
5,664,243 A    9/1997    Okada et al.
(Continued)

FOREIGN PATENT DOCUMENTS

JP    63-229851 A    9/1988
JP    03-010380 A    1/1991
(Continued)

OTHER PUBLICATIONS

Edward R. Dowski, Jr., Robert H. Cormack, Scott D. Sarama, "Wavefront Coding, jointly optimized and digital imaging systems", CDM Optics, Inc., Boulder, CO.
(Continued)

*Primary Examiner* — Thien M Le
*Assistant Examiner* — April Taylor
(74) *Attorney, Agent, or Firm* — Procopio, Cory, Hargreaves & Savitch LLP

(57) ABSTRACT

An imaging device, a manufacturing method of an imaging device, and an information code reading device configurable not only to simplify their optical system and to reduce their costs, but also to suppress fluctuations of resin lenses and deterioration of lens performances due to its expansion. An optical system has a second lens made of resin and the other lenses made of glass. The power of the resin lens is small in comparison with that of the glass lens, wherein each power is set to be small in comparison with that of the optical system. In the lens frame structures, the lens holding part and the imaging element holding part are separately constituted, the lens holding part and imaging element holding part are fastened through the intermediate member, expansion coefficients of the lens holding unit and the imaging element holding unit are different so as to control the coefficients.

29 Claims, 24 Drawing Sheets

(56) References Cited

U.S. PATENT DOCUMENTS

| | | | |
|---|---|---|---|
| 5,748,371 | A | 5/1998 | Cathey, Jr. et al. |
| 6,021,005 | A | 2/2000 | Cathey, Jr. et al. |
| 6,069,738 | A | 5/2000 | Cathey, Jr. et al. |
| 6,148,528 | A | 11/2000 | Jackson |
| 6,233,060 | B1 | 5/2001 | Shu et al. |
| 6,241,656 | B1 | 6/2001 | Suga |
| 6,449,087 | B2 | 9/2002 | Ogino |
| 6,525,302 | B2 | 2/2003 | Dowski, Jr. et al. |
| 6,606,669 | B1 | 8/2003 | Nakagiri |
| 6,642,504 | B2 | 11/2003 | Cathey, Jr. |
| 6,984,206 | B2 | 1/2006 | Kumei et al. |
| 7,158,660 | B2 | 1/2007 | Gee et al. |
| 7,400,393 | B2 | 7/2008 | Shibata et al. |
| 7,583,301 | B2 | 9/2009 | Sakurai et al. |
| 7,630,584 | B2 | 12/2009 | Nose et al. |
| 7,719,772 | B2 | 5/2010 | Mann et al. |
| 2002/0118457 | A1 | 8/2002 | Dowski |
| 2003/0076514 | A1 | 4/2003 | Gallagher et al. |
| 2003/0122926 | A1 | 7/2003 | Kumei et al. |
| 2003/0137746 | A1* | 7/2003 | Kitaoka et al. ............ 359/687 |
| 2003/0158503 | A1 | 8/2003 | Matsumoto |
| 2004/0136605 | A1 | 7/2004 | Seger et al. |
| 2004/0178268 | A1* | 9/2004 | Yui ............................ 235/454 |
| 2004/0190762 | A1 | 9/2004 | Dowski et al. |
| 2004/0257677 | A1 | 12/2004 | Matsusaka |
| 2005/0128342 | A1 | 6/2005 | Izukawa |
| 2005/0162538 | A1* | 7/2005 | Kurosawa .................... 348/335 |
| 2005/0168846 | A1* | 8/2005 | Ye et al. ..................... 359/819 |
| 2005/0200972 | A1* | 9/2005 | Nose et al. ................. 359/689 |
| 2006/0006239 | A1* | 1/2006 | Tanaka ................... 235/472.01 |
| 2006/0012385 | A1 | 1/2006 | Tsao et al. |
| 2007/0086674 | A1 | 4/2007 | Guan |
| 2007/0097249 | A1* | 5/2007 | Korenaga .................... 348/335 |
| 2007/0268376 | A1 | 11/2007 | Yoshikawa et al. |
| 2007/0291152 | A1 | 12/2007 | Suekane et al. |
| 2008/0007797 | A1 | 1/2008 | Hayashi |
| 2008/0043126 | A1 | 2/2008 | Hayashi |
| 2008/0074507 | A1 | 3/2008 | Ohara et al. |
| 2008/0081996 | A1 | 4/2008 | Grenon et al. |
| 2008/0259275 | A1 | 10/2008 | Aoki et al. |
| 2008/0278592 | A1 | 11/2008 | Kuno et al. |

FOREIGN PATENT DOCUMENTS

| | | | |
|---|---|---|---|
| JP | 03-175403 | A | 7/1991 |
| JP | 06-130267 | | 5/1994 |
| JP | H08-128923 | A | 5/1996 |
| JP | 10-145667 | A | 5/1998 |
| JP | 11-261868 | A | 9/1999 |
| JP | 2000-050146 | A | 2/2000 |
| JP | 2000-098301 | A | 7/2000 |
| JP | 2000-266979 | A | 9/2000 |
| JP | 2000-275582 | A | 10/2000 |
| JP | 2001-257930 | A | 9/2001 |
| JP | 2001-346069 | A | 12/2001 |
| JP | 2002-027047 | | 1/2002 |
| JP | 2002-127852 | A | 5/2002 |
| JP | 2002-221657 | A | 9/2002 |
| JP | 2003-185905 | | 7/2003 |
| JP | 2003-235794 | | 8/2003 |
| JP | 2003-244530 | A | 8/2003 |
| JP | 2003-248171 | | 9/2003 |
| JP | 2003-262778 | | 9/2003 |
| JP | 2003-283878 | A | 10/2003 |
| JP | 2008-017157 | A | 1/2004 |
| JP | 2004-037733 | | 2/2004 |
| JP | 2004-147188 | A | 5/2004 |
| JP | 2004-153497 | A | 5/2004 |
| JP | 2004-264577 | | 9/2004 |
| JP | 2004-328506 | A | 11/2004 |
| JP | 2005-326684 | A | 11/2004 |
| JP | 2006-139246 | A | 1/2006 |
| JP | 2006-049949 | A | 2/2006 |
| JP | 2006-094112 | A | 4/2006 |
| JP | 2006-154767 | | 6/2006 |
| JP | 2006-308987 | | 11/2006 |
| JP | 2007-060647 | A | 3/2007 |
| JP | 2007-300208 | A | 11/2007 |
| JP | 2008-035282 | A | 2/2008 |
| WO | 2006/022373 | A1 | 3/2006 |
| WO | 2007/013621 | A1 | 2/2007 |
| WO | 2007/074649 | A1 | 7/2007 |

OTHER PUBLICATIONS

Edward R. Dowski, Jr., Gregory E. Johnson, "Wavefront Coding: A modern method of achieving high performance and/or low cost imaging systems", CDM Optics, Inc., Boulder, CO.
Office Action dated Mar. 10, 2010 issued for U.S. Appl. No. 11/773,792.
Final Office Action dated Aug. 18, 2010 issued for U.S. Appl. No. 11/773,792.
Office Action dated Jun. 10, 2010 issued for U.S. Appl. No. 11/861,217.
International Search Report dated May 12, 2009 issued by the Japanese Patent Office for International Application No. PCT/JP2009/056376.
Dowski, Edward R. Jr., et al., "Extended Depth of Field through Wave-Front Coding", Appl. Opt. vol. 34, p. 1859-1866 (1995).
Office Action dated Jan. 19, 2011 issued by the Japanese Patent Office for Japanese Application No. JP 2006-259646.
Edward R. Dowski, Jr., Robert H. Cormack, Scott D. Sarama, "Wavefront Coding, jointly optimized and digital imaging systems", CDM Optics, Inc., Boulder, CO, 2000.
Edward R. Dowski, Jr., Gregory E. Johnson, "Wavefront Coding: A modern method of achieving high performance and/or low cost imaging systems", CDM Optics, Inc., Boulder, CO, 1999.

* cited by examiner

STATE OF LIGHT BEAMS BY GENERAL OPTICAL SYSTEM

SPOT IMAGE OF OPTICAL SYSTEM

←—122

▶JAN

←—123

CODE49

←—123

QR CODE

FIG. 20

EXAMPLE OF KERNEL DATA STORAGE ROM

| OPTICAL MAGNIFICATION | ×1.5 | ×5 | ×10 |
|---|---|---|---|
| KERNEL DATA | A | B | C |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

$$C = \begin{pmatrix} a' & b' & c' & d' \\ e' & f' & g' & h' \\ i' & j' & k' & l' \\ m' & n' & o' & p' \end{pmatrix}$$

FIG. 21

EXAMPLE OF KERNEL TABLE

| STOP | F2.8 | F4 |
|---|---|---|
| KERNEL | A | B |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

FIG. 22

EXAMPLE OF KERNEL TABLE

| OBJECT DISTANCE INFORMATION | 100mm | 500mm | 4m |
|---|---|---|---|
| KERNEL | A | B | C |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

$$C = \begin{pmatrix} a' & b' & c' & d' \\ e' & f' & g' & h' \\ i' & j' & k' & l' \\ m' & n' & o' & p' \end{pmatrix}$$

IMAGING DEVICE, METHOD OF PRODUCTION OF IMAGING DEVICE, AND INFORMATION CODE-READING DEVICE

FIELD OF THE INVENTION

The present invention relates to an imaging device which uses an imaging element and is provided with an optical system, a method of production of an imaging device, and an information code reading device.

BACKGROUND

In recent years, rapid advances have been made in digitalization of information. This has led to remarkable efforts to meet with this in the imaging field.

In particular, as symbolized by the digital camera, in imaging surfaces, the conventional film is being taken over by use of solid-state imaging elements such as CCDs (charge coupled devices) or CMOS (complementary metal oxide semiconductor) sensors in most cases.

An imaging lens device using a CCD or CMOS sensor for the imaging element in this way optically captures the image of an object by the optical system and extracts the image as an electric signal by the imaging element. Other than a digital still camera, this is used in a video camera, a digital video unit, a personal computer, a mobile phone, a personal digital assistant (PDA), an image inspection system, an industrial camera for automatic control, and so on.

FIG. 1 is a view schematically showing the configuration of a general imaging lens device and a state of light beams.

This imaging lens device 1 has an optical system 2 and a CCD or CMOS sensor or other imaging element 3.

The optical system includes object side lenses 21 and 22, a stop 23, and an imaging lens 24 sequentially arranged from the object side (OBJS) toward the imaging element 3 side.

In the imaging lens device 1, as shown in FIG. 1, the best focus surface is made to match with the imaging element surface.

FIG. 2A to FIG. 2C show spot images on a light receiving surface of the imaging element 3 of the imaging 20, lens device 1.

Further, imaging devices using phase plates to regularly disperse the light beams, using digital processing to restore the image, and thereby enabling capture of an image having a deep depth of field and so on have been proposed (see for example Non-patent Documents 1 and 2 and Patent Documents 1 to 5).

Further, an automatic exposure control system of a digital camera performing filter processing using a transmission function has been proposed (see for example Patent Document 6).

Further, in a CCD, CMOS, or other device having an image input function, reading a barcode or other proximate still image together with for example scenery or another desired image is extremely useful in many cases.

A barcode is read for example narrowing an F value in for example a camera so as to expand the depth of field and obtain a fixed focus by the technique of focusing by auto-focusing extending a lens as a first example or a depth expansion technique as a second example.

Further, a technique of increasing the field in focus is disclosed in for example Patent Document 8.

Non-patent Document 1: "Wavefront Coding; jointly optimized optical and digital imaging systems", Edward R. Dowski, Jr., Robert H. Cormack, Scott D. Sarama.

Non-patent Document 2: "Wavefront Coding; A modern method of achieving high performance and/or low cost imaging systems", Edward R. Dowski, Jr., Gregory E. Johnson.

Patent Document 1: U.S. Pat. No. 6,021,005
Patent Document 2: U.S. Pat. No. 6,642,504
Patent Document 3: U.S. Pat. No. 6,525,302
Patent Document 4: U.S. Pat. No. 6,069,738
Patent Document 5: Japanese Patent Publication (A) No. 2003-235794
Patent Document 6: Japanese Patent Publication (B) No. 2004-153497
Patent Document 7: Japanese Patent Publication (C) No. 2004-37733
Patent Document 8: Japanese Patent Publication (D) No. 2002-27047

SUMMARY

All of the imaging devices proposed in the documents explained above are predicated on a PSF (Point-Spread-Function) being constant when inserting the above phase plate in the usual optical system. If the PSF changes, it is extremely difficult to realize an image having a deep depth of field by convolution using the subsequent kernels.

Accordingly, leaving aside lenses with single focal points, in lenses of a zoom system, an AF system, etc., the high level of precision of optical design and the accompanying increase in costs causes a major problems in adoption.

In other words, in a conventional imaging device, suitable convolution processing is not possible. An optical design eliminating astigmatism, coma aberration, zoom chromatic aberration, and other aberration causing deviation of the spot image at the time of the "wide" mode and at the time of the "tele" mode is required.

However, an optical design eliminating these aberrations increases the difficulty of the optical design and induces problems such as an increase of the number of design processes, an increase of the costs, and an increase in size of the lenses.

Further, in the techniques described above, the desired depth of field can be obtained at ordinary temperature, but in the case of a high temperature and in the case of a low temperature, the back focus (distance between a surface on an imaging element side of the last lens which is arranged at the proximate side of the imaging element side and the imaging element) differs so the focus position differs.

Further, if a plastic lens ends up having a strong power, it remarkably changes in performance due to a temperature change. Therefore, even if performing processing for restoring this, a sufficient image quality cannot be obtained.

Further, when linear expansion differs between a plastic lens and a lens holding portion, due to the difference of thermal expansion accompanying a temperature change, the lens is liable to rattle or crack.

The present invention provides an imaging device not only capable of simplifying the optical system and enabling cost reduction, but also capable of suppressing fluctuation of a plastic lens and suppressing deterioration of performances of lenses due to expansion and capable of obtaining a restored image with a suitable image quality and with a small influence by noise, a method of production of the imaging device, and an information code reading device.

An imaging device of a first aspect of the present invention has an optical system having a fixed focal point which includes lenses made of glass and plastic, an imaging element capturing an object image passed through the optical system, and a lens frame structure holding the optical system and the imaging element, wherein the lens frame structure includes a lens holding part holding lenses of the optical system and an imaging element holding part holding the imaging element.

Preferably, relative position relationships between lenses and the imaging element due to a temperature change are adjusted by making a linear expansion coefficient of the lens holding part variable.

Preferably, when a sum of power of plastic lenses included in the optical system is negative, a distance between a surface on the imaging element side of the last lens which is arranged at the proximate side of the imaging element side and the imaging element becomes shorter at a temperature higher than ordinary temperature and becomes longer at a temperature lower than ordinary temperature.

Preferably, when a sum of power of plastic lenses included in the optical system is positive, a distance between a surface on the imaging element side of the last lens which is arranged at the proximate side of the imaging element side and the imaging element becomes longer at a temperature higher than ordinary temperature and becomes shorter at a temperature lower than ordinary temperature.

Preferably, the lens frame structure has an intermediate member with one end side which fastens the lens holding part and the other end side which fastens the imaging element holding part.

Preferably, the linear expansion coefficient of the intermediate member is smaller compared with the linear expansion coefficients of the lens holding part and the imaging element holding part.

Preferably, the intermediate member and the lens holding part are fastened on the side closer to the object than the center portion in an axial direction of the lens holding part.

Preferably, the power of the optical system is set so that the power of the plastic lens is smaller than the power of the glass lens and smaller than the power of the optical system.

Preferably, a dispersed image of an object captured at the imaging element is an image which is not in focus on the imaging element and in which light beams having a deep depth and a blurred portion are formed, and the device further has an image processing part for generating an image signal having less dispersion than the dispersed image signal of the object from the imaging element.

Preferably, the optical system includes at least a first lens on the object side and a second lens arranged closer to the imaging element side than the first lens, the first lens is formed by a glass lens, and the second lens is formed by a plastic lens.

Preferably, in the optical system, a first lens, a second lens, a third lens, and a fourth lens are sequentially arranged from the object side, the first lens is formed by a glass lens, and at least the second lens among the second, third, and fourth lenses is formed by a plastic lens.

Preferably, the optical system has an optical wavefront modulation function, and phases of the optical wavefront modulation function are represented by the following equation where an optical axis of the optical system is plotted on a z-axis, and two axes orthogonal to each other are defined as x and y:

$$z = \exp\left\{i \times \left(\sum_{j=1} C_j x^m y^n\right)\right\}$$ [Equation 1]

where $n$ and $m$ are integers $j = \frac{[(m+n)^2 + m + 3n]}{2}$, $|x| \leq 1, |y| \leq 1$ A second aspect of the present invention is an information code reading device for optically reading an information code, comprising an optical system having a fixed focal point which includes lenses made of glass and plastic, an imaging element capturing an object image passed through the optical system, and a lens frame structure holding the optical system and the imaging element, wherein the lens frame structure includes a lens holding part holding lenses of the optical system and an imaging element holding part for holding the imaging element.

An imaging device of a third aspect of the present invention has an optical system having a fixed focal point which includes lenses made of glass and plastic, an imaging element capturing an object image passed through the optical system, and a lens frame structure holding the optical system and the imaging element, wherein the lens frame structure includes a lens holding part holding-lenses of the optical system and an imaging element holding part holding the imaging element and can select and fix positions of the lens holding part and the imaging element holding part from among a plurality of positions at different locations in an optical axis direction.

Preferably, the back focus at ordinary temperature is not changed, but according to the temperature condition under which a lens unit including the optical system, the imaging element, and the lens frame structure is used, it is possible to select and fix the imaging element side from among the plurality of positions in a case where the back focus becomes longer than that at the time of ordinary temperature and select and fix the object side from among the plurality of positions in a case where the back focus becomes shorter than that at the time of ordinary temperature.

Preferably, when a sum of power of plastic lenses included in the optical system is negative and the back focus is shorter at a temperature higher than ordinary temperature, the object side can be selected and fastened from among the plurality of fastening positions, and when the back focus is longer at a temperature lower than ordinary temperature, the imaging element side can be selected and fastened from among the plurality of fastening positions.

Preferably, when a sum of power of plastic lenses included in the optical system is positive and the back focus is longer at a temperature higher than ordinary temperature, the imaging element side can be selected and fastened from among the plurality of fastening positions, and when the back focus is shorter at a temperature lower than ordinary temperature, the object side can be selected and fastened from among the plurality of fastening positions.

Preferably, the lens frame structure has an intermediate member with one end side which can fix the lens holding part and the other end side which can fix the imaging element holding part, and fastening positions of the lens holding part and the imaging element holding part can be adjusted by the intermediate member.

A fourth aspect of the present invention is an information code reading device for optically reading an information code, comprising an optical system having a fixed focal point which includes lenses made of glass and plastic, an imaging element for capturing an object image passed through the optical system, and a lens frame structure for holding the optical system and the imaging element, wherein the lens frame structure includes a lens holding part for holding lenses of the optical system and an imaging element holding part for holding the imaging element and can select and fix positions of the lens holding part and the imaging element holding part from among the plurality of positions at different locations in the optical axis direction.

A method of production of an imaging device of a fifth aspect of the present invention has a first step of setting each lens of an optical system including lenses made of glass and plastic in a lens holding part, a second step of setting an imaging element in an imaging element holding part, a third step of making a surface on an imaging element side of a last lens which is arranged at the proximate side of the imaging element side and a light receiving surface of the imaging element face each other, and a fourth step of selectively fastening the lens holding part and the imaging element holding part at positions by which fluctuation of the position of the back focus accompanying a temperature change can be relatively absorbed.

A method of production of an imaging device of a sixth aspect of the present invention has a first step of setting each lens of an optical system including lenses made of glass and plastic in a lens holding part, a second step of setting an imaging element in an imaging element holding part, a third step of making a surface on an imaging element side of a last lens which is arranged at the proximate side of the imaging element side and a light receiving surface of the imaging element face each other, and a fourth step of fastening the parts so that fluctuation of the position of back focus accompanying a temperature change can be relatively absorbed by selection of fastening positions or materials of the lens holding part and the imaging element holding part.

Preferably, the fastening positions of the lens holding part and the imaging element holding part are variable so that the lens unit can cope with a high temperature to a low temperature without changing the back focus at ordinary temperature.

Preferably, in the fourth step, the lens holding part and the imaging element holding part are selectively fastened so that, when the sum of power of plastic lenses included in the optical system is negative, the distance between the surface on the imaging element side of the last lens which is arranged at the proximate side of the imaging element side and the imaging element becomes shorter at a temperature higher than ordinary temperature, but becomes longer at a temperature lower than ordinary temperature.

Preferably, in the fourth step, the lens holding part and the imaging element holding part are selectively fastened so that, when the sum of power of plastic lenses included in the optical system is positive, the distance between the surface on the imaging element side of the last lens which is arranged at the proximate side of the imaging element side and the imaging element becomes longer at a temperature higher than ordinary temperature and becomes shorter at a temperature lower than ordinary temperature.

Preferably, the lens holding part and the imaging element holding part are fastened by interposing an intermediate member between these.

Preferably, the power of the optical system is set so that the power of the plastic lens is smaller than the power of the glass lens and smaller than the power of the optical system.

Preferably, the optical system includes at least a first lens on the object side and a second lens arranged closer to the imaging element side than the first lens, the first lens is formed by a glass lens, and the second lens is formed by a plastic lens.

Preferably, in the optical system, the first lens is formed by a glass lens, at least the second lens among the second, third, and fourth lenses is formed by a plastic lens, and the lenses of the optical system are arranged in the lens holding part so that the order of lenses becomes the first lens, the second lens, the third lens, and the fourth lens from the object side.

According to the present invention, there are the advantages that not only can the optical system be simplified and the cost reduced, but also fluctuation of plastic lenses can be suppressed, deterioration of performance of lenses due to expansion can be suppressed, and in addition a restored image with a suitable image quality and small influence by noise can be obtained.

BRIEF DESCRIPTION OF THE DRAWINGS

FIG. 2A to FIG. 2C are diagrams showing spot images on a light receiving surface of an imaging element of the imaging lens device, in which FIG. 2A is a diagram showing a spot image in a case where a focal point is deviated by 0.2 mm (Defocus=0.2 mm), FIG. 2B is a diagram showing a spot image in a case of focus (Best focus), and FIG. 2C is a diagram showing a spot image in a case where the focal point is deviated by −0.2 mm (Defocus=−0.2 mm).

FIG. 20 is a diagram showing an example (optical magnification) of storage data of a kernel data ROM.

FIG. 21 is a diagram showing another example (F number) of storage data of the kernel data ROM.

FIG. 22 is a diagram showing another example (F number) of storage data of the kernel data ROM.

DETAILED DESCRIPTION

Below, embodiments of the present invention will be explained with reference to the accompanying drawings.

Figure 1:
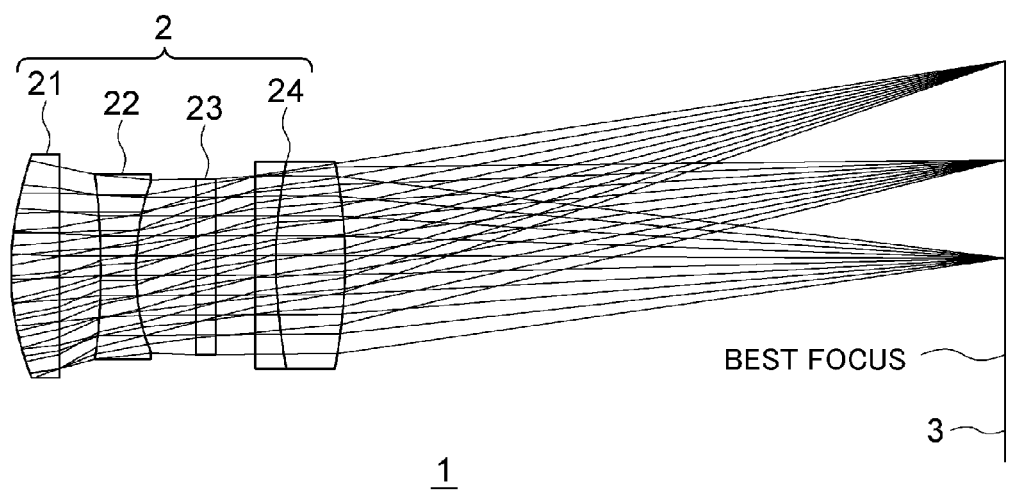
FIG. 1 is a diagram schematically showing the configuration of a general imaging lens device and a state of light beams.
Figure 2A:
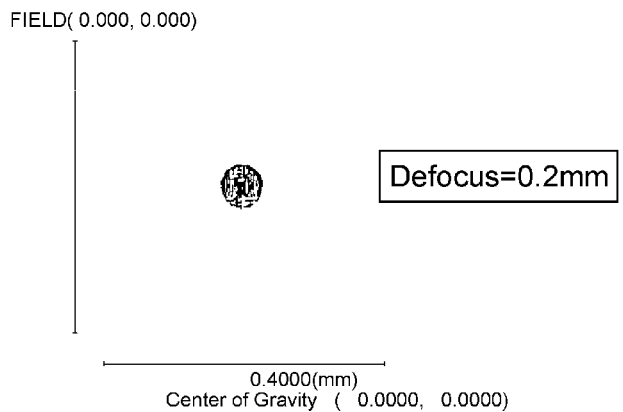
Figure 2B:
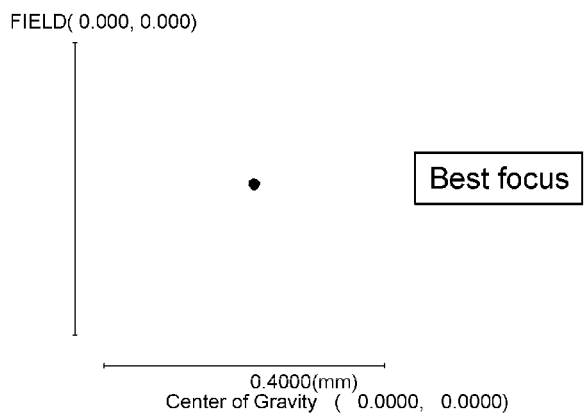
Figure 2C:
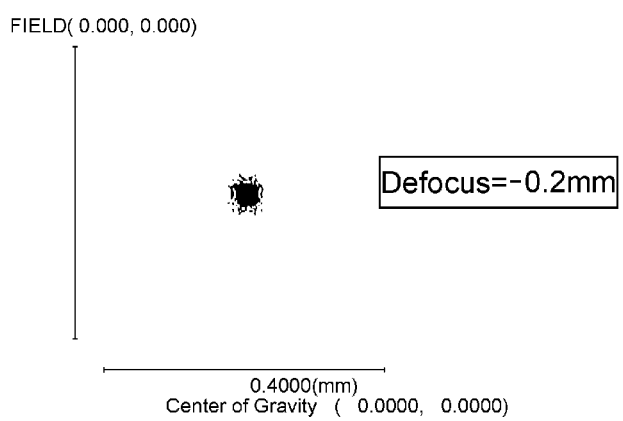
Figure 3:
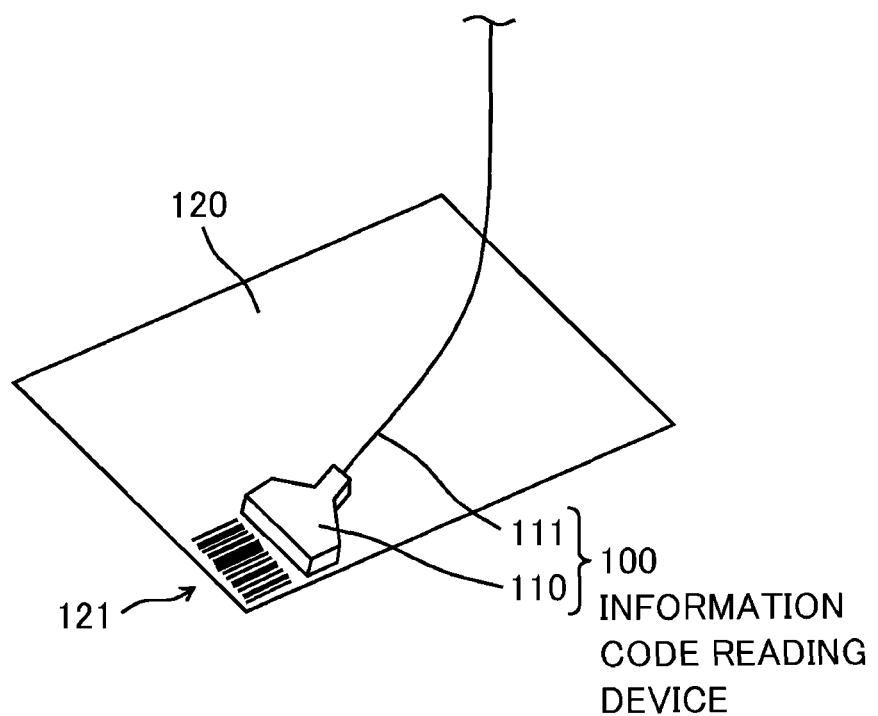
FIG. 3 is a view of an outer appearance showing an example of an information code reading device according to an embodiment of the present invention.

FIG. 3 is a view of an outer appearance showing an example of an information code reading device according to an embodiment of the present invention.

Figure 4A:
FIG. 4A to FIG. 4C are diagrams showing examples of an information code.
Figure 4B:
Figure 4C:
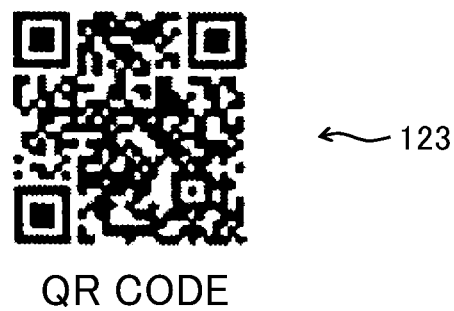

FIG. 4A to FIG. 4C are diagrams showing examples of an information code.

Figure 5:
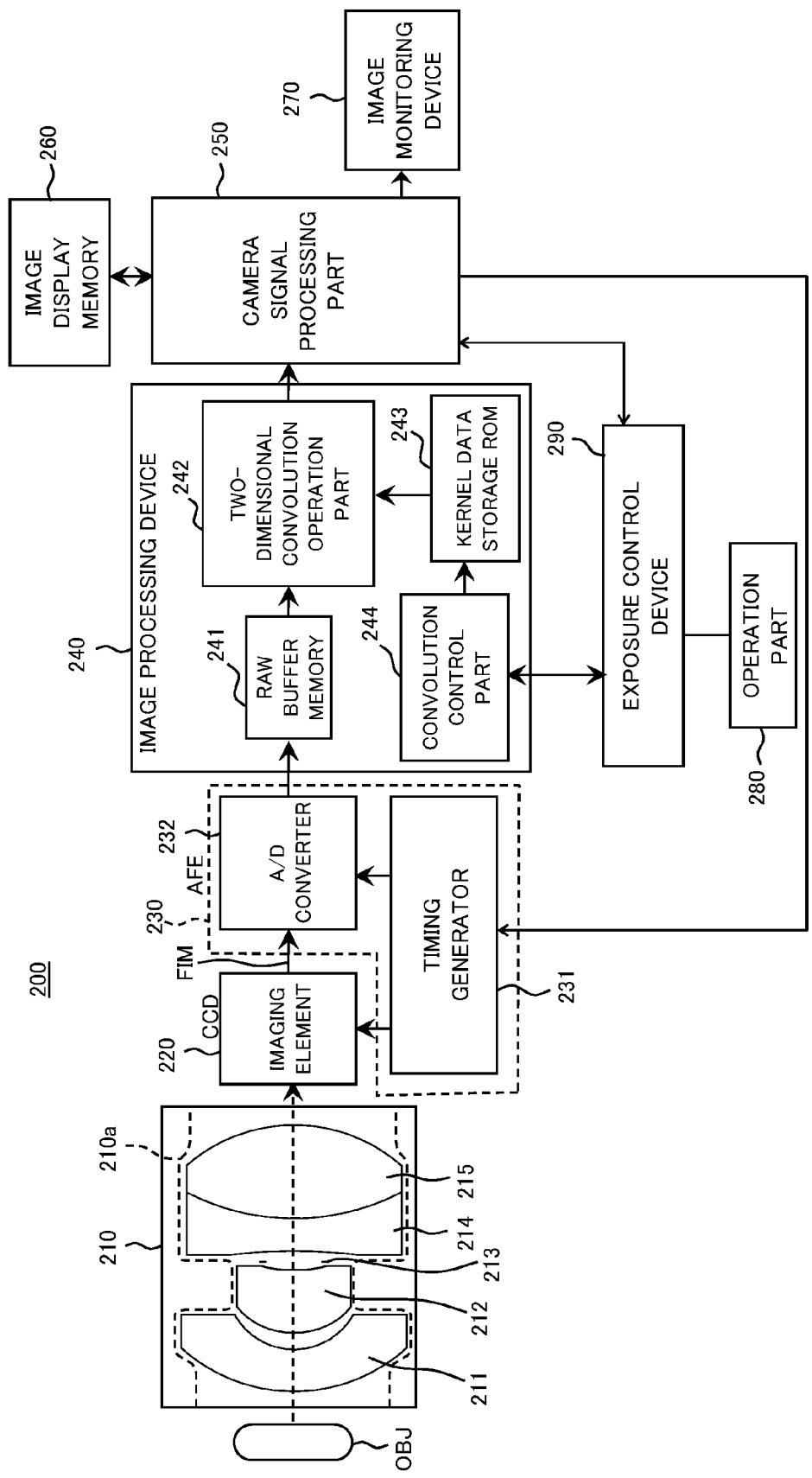
FIG. 5 is a block diagram showing an example of the configuration of an imaging device applied to the information code reading device of FIG. 3.

FIG. 5 is a block diagram showing an example of the configuration of an imaging device applied to the information code reading device of FIG. 3.

An information code reading device 100—according to the present embodiment is a device, as shown in FIG. 3, where a body 110 is connected through a cable 111 to a not shown processing device of an electronic cash register or the like and where symbols, codes, and other information code 121 having different reflection ratios which are printed on a read object 120 can be read.

As the information code of the read object, there can be mentioned, for example, a one-dimensional barcode 122 such as the JAN code as shown in FIG. 4A, a stack type CODE49 as shown in FIG. 4B and FIG. 4C, or two-dimensional barcode 123 such as a matrix type QR code.

In the information code reading device 100 according to the present embodiment, a not shown illumination light source and imaging device 200 as shown in FIG. 5 are arranged in the body 110.

The imaging device 200 is configured so that, as will be explained in detail later, to employ a system such as a wavefront aberration control optical system applying an optical wavefront modulation element to the optical system, regularly dispersing light beams by the optical wavefront modulation element, restoring an image by digital processing, and thereby enabling capture of an image having a deep depth of field or a depth expansion optical system (DEOS) and enable reading of a one-dimensional barcode such as a JAN code and a two-dimensional barcode such as a QR code or other information code with high accuracy and high definition.

The imaging device 200 of the information code reading device 100, as shown in FIG. 5, has an optical system 210, imaging element 220, analog front end part (AFE) 230, image processing device 240, camera signal processing part 250, image display memory 260, image monitoring device 270, operation part 280, and control device 290.

Further, an image signal of an information code captured by the imaging device 200 and processed is decoded by a not shown information code decoding system. The decoded data is transmitted from a not shown data transmission part to a not shown data processing device of an electronic cash register etc. through a cable 111 or by wireless communication.

Figure 6:
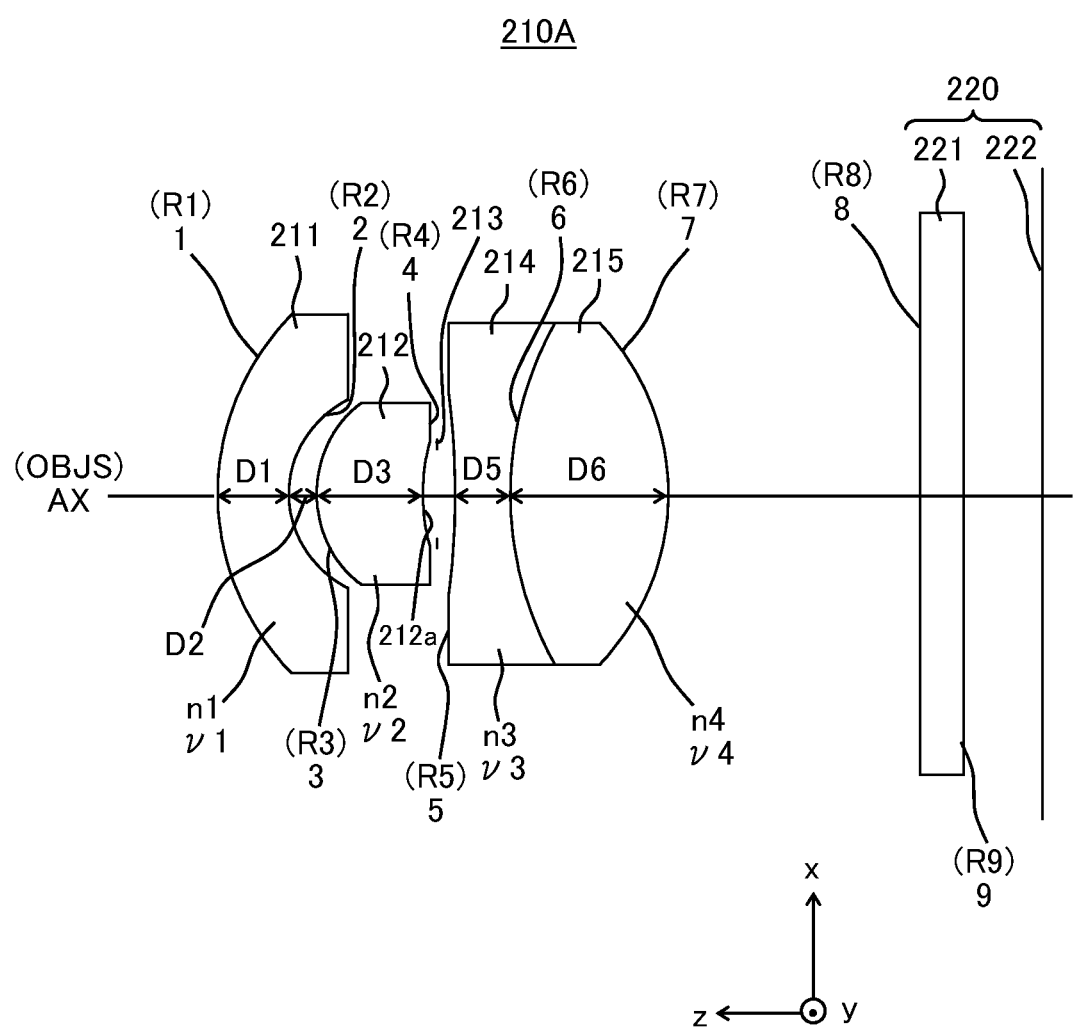
FIG. 6 is a diagram showing a basic configuration of an imaging lens unit for forming an optical system according to the present embodiment.

FIG. 6 is a diagram showing a basic configuration of an imaging lens unit for forming an optical system according to the present embodiment.

An optical system 210A supplies an image capturing an object OBJ to the imaging element 220. Further, the optical system 210A has a first lens 211, second lens 212, stop 213, third lens 214, and fourth lens 215.

In the optical system 210A, from the object side, the first lens 211, second lens 212, stop 213, third lens 214, and fourth lens 215 are sequentially arranged.

In the optical system 210A of the present embodiment, the third lens 214 and the fourth lens 215 are connected. Namely, the lens unit of the optical system 210A of the present embodiment includes a joint lens.

Further, the optical system 210A of the present embodiment is configured as an optical system able to cope with temperature changes.

The first lens 211 on the side in contact with the object, third lens 214, and fourth lens 215 are formed by glass, and the second lens 212 is formed by plastic.

Further, the device is configured so that, by controlling the power of the plastic lens, which has a large linear expansion in comparison with glass and sensitively reacts to a temperature change, even when a usage environment covers a range from low temperature to high temperature, a sufficient performance can be secured. Further, any change of the depth of field due to temperature can be eased in the depth expansion optical system.

More specifically, the first lens 211, third lens 214, and fourth lens 215 are formed by glass, the second lens 212 is formed by plastic, and the power is set so that the power of the plastic lens is smaller than the power of the glass lens and smaller than the power of the optical system 210A.

Further, the optical system 210A is desirably set so that the linear expansion coefficient of a portion 210a for holding the lens (holder) is smaller than that of the plastic lens.

In the optical system 210A of the present embodiment, in place of providing an optical wavefront modulation element separate from the lens, that function is imparted to for example the second lens 212.

A center portion centered about the optical axis of the surface of the imaging surface side of the second lens 212 is formed in a concave shape given a predetermined curvature. The second lens 212 has the function of an optical wavefront modulation element by this shape.

Figure 7:
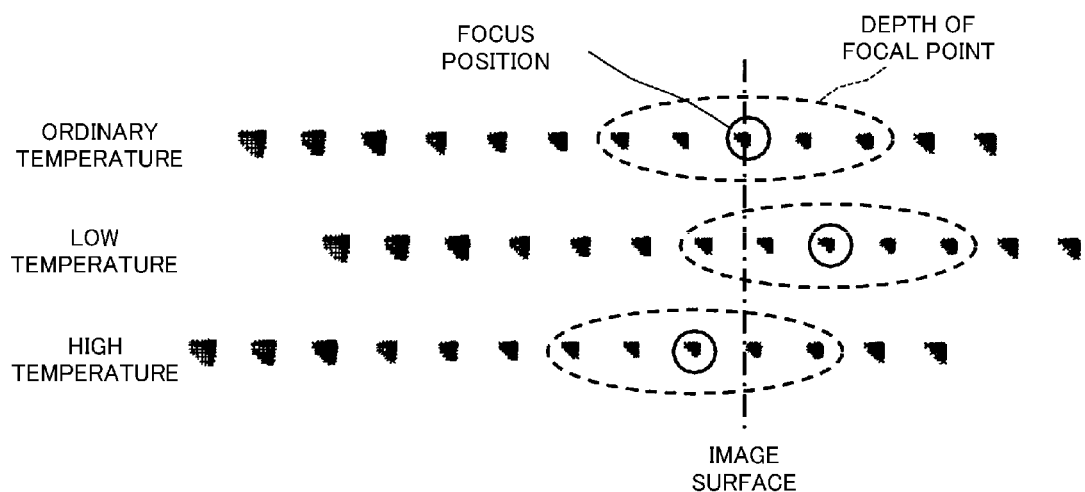
FIG. 7 is a defocus diagram of an analog spot image when a plastic lens has a strong negative power.

FIG. 7 is a defocus diagram of an analog spot image when the plastic lens has a strong negative power.

Figure 8:
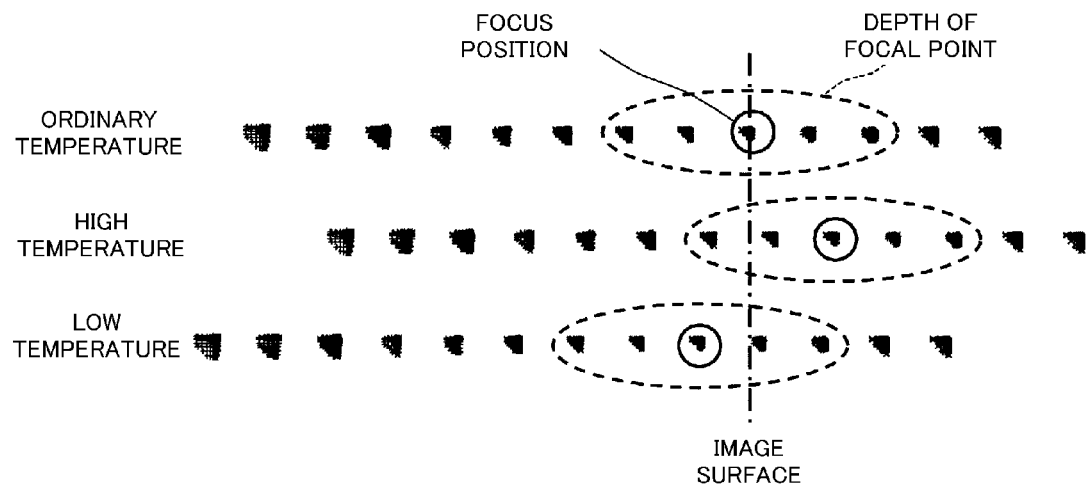
FIG. 8 is a defocus diagram of an analog spot image when a plastic lens has a strong positive power.

FIG. 8 is a defocus diagram of an analog spot image when the plastic lens has a strong positive power.

Figure 9:
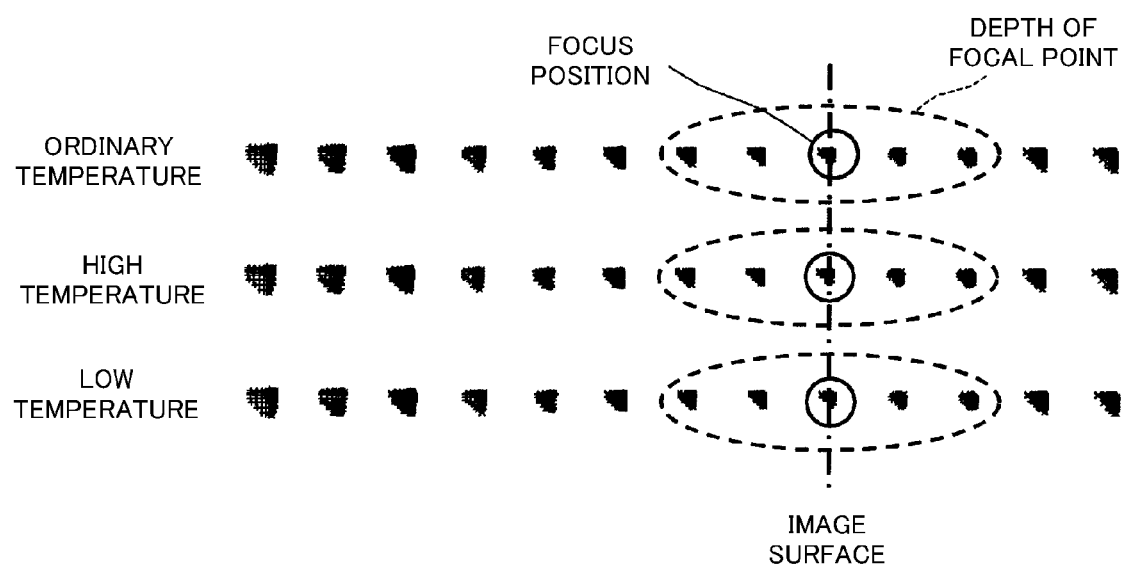
FIG. 9 is a defocus diagram of an analog spot image when the power of the plastic lens is suppressed as in the optical system of the present embodiment.

FIG. 9 is a defocus diagram of an analog spot image obtained by suppressing the power of the plastic lens as in the optical system of the present embodiment.

As shown in FIG. 7 and FIG. 8, the analog spot image when the plastic lens has a strong negative or positive power differs when at the ordinary temperature, high temperature side, and low temperature side, so a sufficient performance cannot be secured.

Contrary to this, the optical system 210A of the present embodiment has power set so that the power of the plastic lens becomes smaller than the power of the glass lens and smaller in comparison with the power of the optical system 210A. Therefore, as shown in FIG. 9, even when the usage environment covers a range from low temperature to high temperature, sufficient performance can be secured. Further, any change of the depth of field along with temperature can be eased in the depth expansion optical system.

Note that, in the optical system 210A, the shape of the aspherical surface of the lens is represented by the following equation where a direction toward an image surface side from the object side is designated as positive, k is a conical coefficient, A, B, C, and D are aspherical coefficients, and r is a center curvature radius. h represents the height of the light beam, and c represents a reciprocal of the center curvature radius. Note, Z represents the depth from a contact plane to the surface vertex, A represents a fourth order aspherical coefficient, B represents a sixth order aspherical coefficient, C represents an eighth order aspherical coefficient, and D represents a 10th order aspherical coefficient.

Aspherical formula $$Z = \frac{ch^2}{1 + \sqrt{1-(1+k)c^2h^2}} + Ah^4 + Bh^6 + Ch^8 + Dh^{10} + \alpha(x^3+y^3) + \beta(x^5+y^5)$$

[Equation 2]

Further, $\alpha$ and $\beta$ are phase surface coefficients, and x and y are directions shown in FIG. 6.

By employing the above configuration, an object imaging lens can be realized.

Further, as shown in FIG. 6, in the optical system (imaging lens unit) 210A of the present embodiment, the center curvature radius of the object side surface 1 of the first lens 211 is set to R1, the center curvature radius of the image surface side 2 of the first lens 211 is set to R2, the center curvature radius of the object side surface 3 of the second lens 212 is set to R3, the center curvature radius of the image surface side surface 4 of the second lens 212 is set to R4, the center curvature radius of the object side surface 5 of the third lens 214 is set to R5, the center curvature radius of the image surface side surface 6 of the third lens 214 is set to R6, the center curvature radius of the image surface side surface 7 of the fourth lens 215 is set to R7, the center curvature radius of the surface 8 on the fourth lens 215 side of the cover glass 221 of the imaging element 220 is set to R8, and the center curvature radius of the surface 9 on the imaging element 220 side of the cover glass 221 is set to R9. Note that, the center curvature radii R8 and R9 of both surfaces 8 and 9 of the cover glass 221 are 0.

Further, a refractive index of the first lens 211 is set to $n_1$, a dispersion value is set to $V_1$, the refractive index of the second lens 212 is set to $n_2$, the dispersion value is set to $V_2$, the refractive index of the third lens 214 is set to $n_3$, the dispersion value is set to $V_3$, the refractive index of the fourth lens 215 is set to $n_4$, and the dispersion value is set to $V_4$.

In the imaging element 220, from the fourth lens 215 side, a parallel flat plate (cover glass) 221 made of glass and an imaging surface 222 of an imaging element comprised of for example a CCD or CMOS sensor are sequentially arranged.

Light from the object OBJ passing through the imaging optical system 210 forms an image on the imaging surface 222 of the imaging element 220.

Note that, the dispersed image of the object captured by the imaging element 220 is an image which is not in focus on the imaging element 220 and has light beams having deep depth and a blurred portion formed therein.

Further, the present embodiment is configured so that, by applying filter processing at the image processing device 240, the resolution of the distance between two objects can be assisted.

This optical system 210 will be explained in further in detail later.

The imaging element 220 is formed by a CCD or CMOS sensor at which the image captured at the optical system 210 is formed and which outputs formed first order image information as a first order image signal FIM of an electric signal to the image processing device 240 through the analog front end part 230.

In FIG. 5, the imaging element 220 is described as a CCD as an example.

The analog front end part 230 has a timing generator 231 and an analog/digital (A/D) converter 232.

The timing generator 231 generates a drive timing of the CCD of the imaging element 220, while the A/D converter 232 converts an analog signal input from the CCD to a digital signal and outputs the result to the image processing device 240.

The image processing device (two-dimensional convolution means) 240 configuring a portion of the signal processing part receives as input the digital signal of the captured image coming from the front stage AFE 230, applies two-dimensional convolution processing to this, and transfers the result to the latter stage camera signal processing part (DSP) 250.

The image processing device 240 carries out the filter processing on the optical transmission function (OTF) in accordance with the exposure information of the control device 290. Note that, the exposure information includes stop information.

The image processing device 240 has a function of performing filter processing (for example convolution filter processing) on a plurality of images from the imaging element 220 so that a response of the optical transmission function (OTF) is improved to eliminate a change of the optical transmission function (OTF) in accordance with the object distance and obtains a deep depth of field even when it depends upon a plurality of object distances. Further, the image processing device 240 has a function of applying noise reduction filtering at the first step.

The image processing device 240 has a function of performing the filter processing on the optical transmission function (OTF) and applying processing for enhancing contrast.

The processing of the image processing device 240 will be explained in further detail later.

The camera signal processing part (DSP) 250 performs color interpolation, white balancing, YCbCr conversion processing, compression, filtering, and other processing and performs storage of data in a memory 260, display of an image to an image monitoring device 270, and so on.

The control device 290 controls exposure and waits for input of an operation from the operation part 280 etc., determines the operation of the entire system in accordance with these inputs, controls the AFE 230, image processing device 240, DSP 250, stop 213, etc. and oversees arbitration control of the entire system.

Next, examples of the configuration of the so-called "lens frame structure" for holding the lenses of the optical system 210 and the imaging element 220 will be explained as first and second embodiments.

<First Embodiment>

Figure 10:
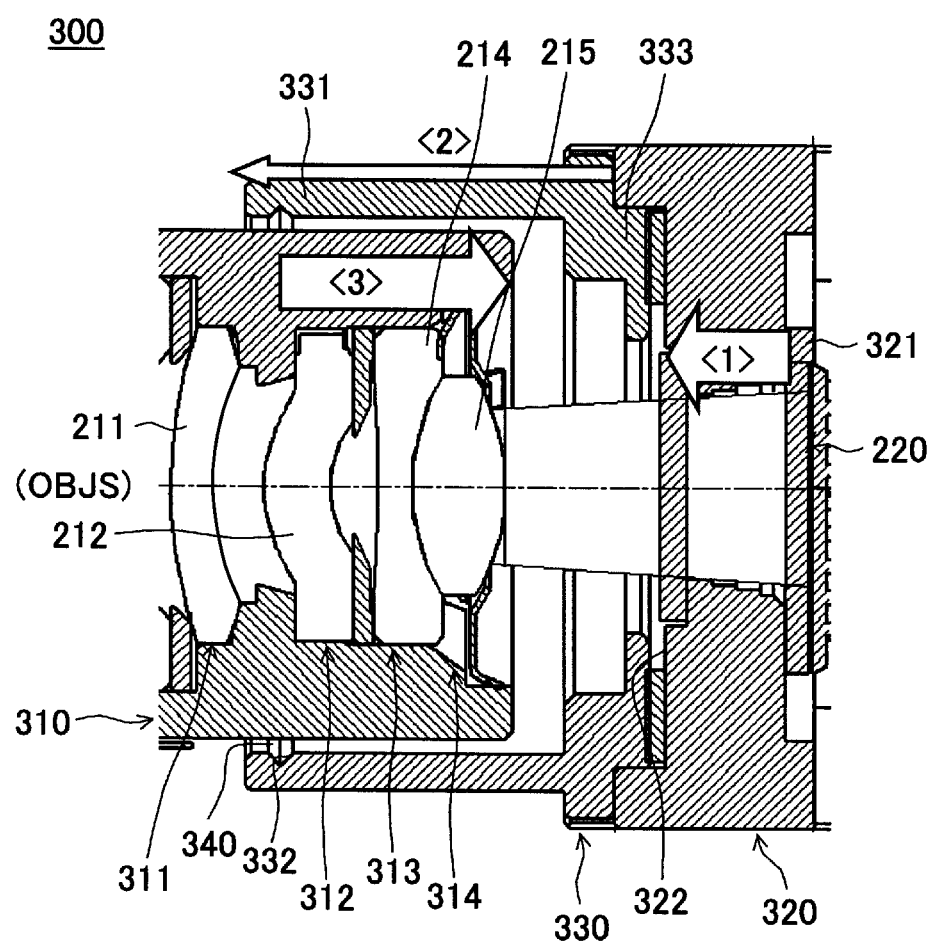
FIG. 10 is a diagram showing an example of the constitution of a lens frame structure according to the present first embodiment.
Figure 11:
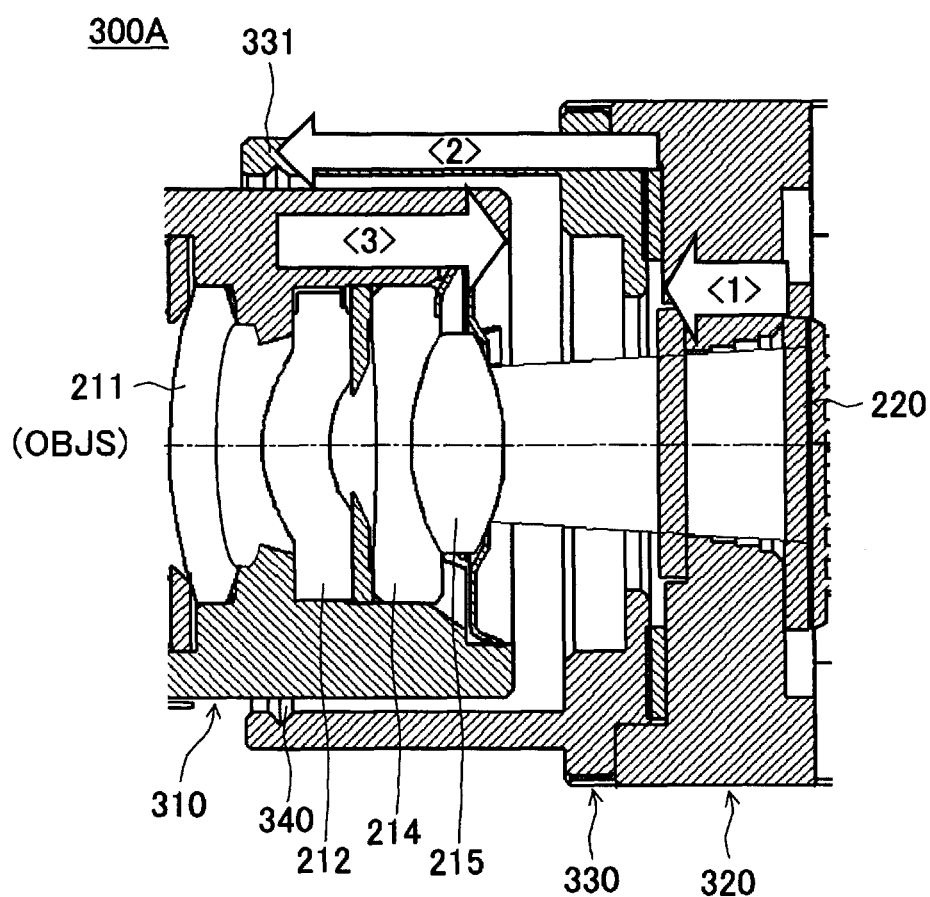
FIG. 11 is a diagram for explaining a fastening method of a lens frame structure according to the present first embodiment.

In the so-called lens frame structures 300 and 300A in the present first embodiment, basically, as shown in FIG. 10 and FIG. 11, a lens holding part 310 and an imaging element holding part 320 are separately constituted. These lens holding part 310 and imaging element holding part 320 are fastened by an intermediate member 330. Further, the linear expansion coefficients of the lens holding part 310 and the imaging element holding part 320 are different.

Further, the device can be constituted so that he influence of the linear expansion coefficient of the lens holding part 310 is larger in comparison with that of the coefficient of the imaging element holding part 320, this coefficient is controlled so as to ease the back focus position deviation and secure sufficient performance even when the usage environment covers a range from a low temperature to a high temperature. Further, the device is constituted so that, in the DEOS (depth expansion optical system), the change of the depth of field due to temperature can be eased as well.

The lens holding part 310 is formed in for example a cylindrical shape. From the object side, a first holding part 311 holding the first lens 211, a second holding part 312 holding the second lens 212, a third holding part 313 holding the third lens 214, and a fourth holding part 314 holding the fourth lens 215 are sequentially formed.

Further, the side of the outside portion of the lens holding part 310 closer to the object than the center in the axial direction is fastened to one end portion of the intermediate member 330 by for example a binder 340.

The lens holding part 310 is formed by for example plastic.

The imaging element holding part 320 is formed in a cylindrical shape having an outer diameter larger than the outer diameter of the lens holding part 310 the center portion is opened in the axial direction, and the imaging element 220 is fastened to the bottom surface side (first surface side) 321.

Further, one end portion 333 of the intermediate member 330 is fastened to the top surface side (object side surface) 322 of the imaging element holding part 320 by a binder or the like.

The imaging element holding part 320 is formed by for example plastic.

The intermediate member 330 is formed in a cylindrical shape having an inner diameter larger than the outer diameter of the lens holding part 310. A pool part 332 of the binder 340 poured when fastening the lens holding part 310 is formed on a circumference at one end portion of an inner wall 331 thereof.

Further, the other end portion of the intermediate member 330 has a flange part 333 formed so as to extend to the inner side, while the outer side surface (bottom surface) of this flange part 333 is fastened so as to abut against the top surface side 322 of the imaging element holding part 320.

This intermediate member 330 is formed by a metal material having a small linear expansion coefficient, for example, aluminum (Al).

In this way, in the lens frame structure 300 of the present first embodiment, the imaging element holding part 320 and lens holding part 310 are fastened, the optical system has a fixed focal point, and linear expansion coefficients of the material of the lens holding part 310 and the material of the imaging element holding part 320 are made different, whereby the device has a mechanism capable of easing positional fluctuations of the back focus due to a temperature change without having a drive mechanism.

By making the linear expansion coefficient of the intermediate member 330 smaller in comparison with the linear expansion coefficients of the lens holding part 310 and the imaging element holding part 320, it is possible to suppress relative positional fluctuation of lenses of the lens frame structure 300 for example for an optical system in which the back focus positional fluctuation of the lens system due to temperature is small and the back focus is sufficiently long.

Further, in the present first embodiment, the device is constituted so that, when the sum of power of the plastic lenses included in the optical system 210 is negative, the distance between the surface on the imaging element 220 side of the fourth lens 215 forming the last lens and the imaging element 220 becomes shorter at a temperature higher than ordinary temperature and becomes longer at a temperature lower than ordinary temperature.

Further, in the present first embodiment, the device is constituted so that when the sum of power of the plastic lenses included in the optical system 210 is positive, the distance between the surface on the imaging element 220 side of the fourth lens 215 forming the last lens and the imaging element 220 becomes longer at a temperature higher than ordinary temperature and becomes shorter at a temperature lower than ordinary temperature.

Further, the intermediate member 330 and the lens holding part 310 are fastened at the side closer to the object than the center portion in the axial direction of the lens holding part 310.

In this way, the present first embodiment configured so that fluctuations of plastic lenses due to temperature are suppressed by suppressing the power of the plastic lenses at a point of time of lens design. Further, the lens holding part 310 and the imaging element holding part 320 are configured separately and are configured so the linear expansion coefficients of the two members are changed so as to suppress the deterioration of performance caused by back focus fluctuation due to temperature.

Here, "design considering temperature" which changes the materials of the imaging element holding part 320 and the lens holding part 310 the imaging element holding part 320 will be explained.

If designing without considering temperature, the back ends up ecpanding one-sidedly at a high temperature when the frame is formed by plastic.

Further, the refractive index becomes smaller in the lens portion when the temperature becomes high. Therefore, when a plastic lens having a particularly strong influence has a negative power, the lens power becomes weak and the back shifts to the shorter side. That is, the lens frame and lenses end up changing in a bad direction due to the temperature.

For this reason, when the imaging element holding part 320 is made of plastic, preferably a plastic lens of the lens system has a positive power.

An actual example shown in FIG. 10 shows how fluctuation is eased in a lens frame when the plastic lens has a negative power.

When assuming a case of high temperature for the current temperature correction barrel, <1> The imaging element holding part 320 is formed by plastic and the back greatly expands to the object side using the imaging element 220 surface as a standard.

<2> The intermediate member 330 formed by aluminum has a small linear expansion in comparison with plastic, therefore the back expands by only a small amount based on the standard of the part receiving the imaging element holding part 320.

<3> The lens holding part 310 is formed by plastic and greatly expands to the imaging element side based on the standard of the adhesion position.

From the above, by the combination of the different linear expansion coefficients of parts materials of the lens frame structure 300, the distance from the last lens surface to the imaging element surface can be made shorter by the lens frame even when the temperature is high, and back focus fluctuation due to temperature can be suppressed.

Conversely, where the power of the plastic lens becomes positive, the lens power becomes weak at a high temperature and the back ends up shifting to the longer side.

For this reason, preferably the back shifts so that the distance from the imaging element surface side of the last lens, that is, the fourth lens 215, to the imaging element 330 surface becomes longer at a high temperature due to the expansion of the lens frame.

The actual example shown in FIG. 11 shows how fluctuation is eased in the lens frame when the power of the plastic lens is positive.

When assuming a case of high temperature for the current temperature correction barrel, <1> The imaging element holding part 320 is formed by plastic and the back greatly expands to the object side based on the standard of the imaging element 220 surface.

<2> The linear expansion of the lens holding part 310 is adjusted so that it links with the back fluctuation of the lens to thereby prevent the back focus from fluctuation even when the temperature is high.

From the above, by the combination of the different linear expansion coefficients of the lens frame part materials, the distance from the last lens surface to the imaging element surface which expands at a high temperature is made suitable, thus back focus fluctuation due to temperature can be suppressed.

Note that, in the constitutions of FIG. 10 and FIG. 11, as the plastic of the lens holding part 310, for example, PCGF20 (linear expansion coefficient 0.000065) is assumed. For this lens holding part 310, preferably the linear expansion coefficient is controlled by making the plastic contain glass.

Note that, in the present first embodiment, use is made of the binder 340 which is cured by irradiating UV-rays. By using such a binder, after freely adjusting the lens holding part (barrel) (for example, after adjusting it also in a direction not parallel to the optical axis), fastening becomes possible.

Note that, the fastening may be performed by providing a convex portion in the lens holding part (barrel) or intermediate member and a concave portion at an opposite side and fitting together those parts. By such a mechanical fastening method, the influence of aging which may occur when a binder is used can be suppressed.

<Second Embodiment>

Figure 12:
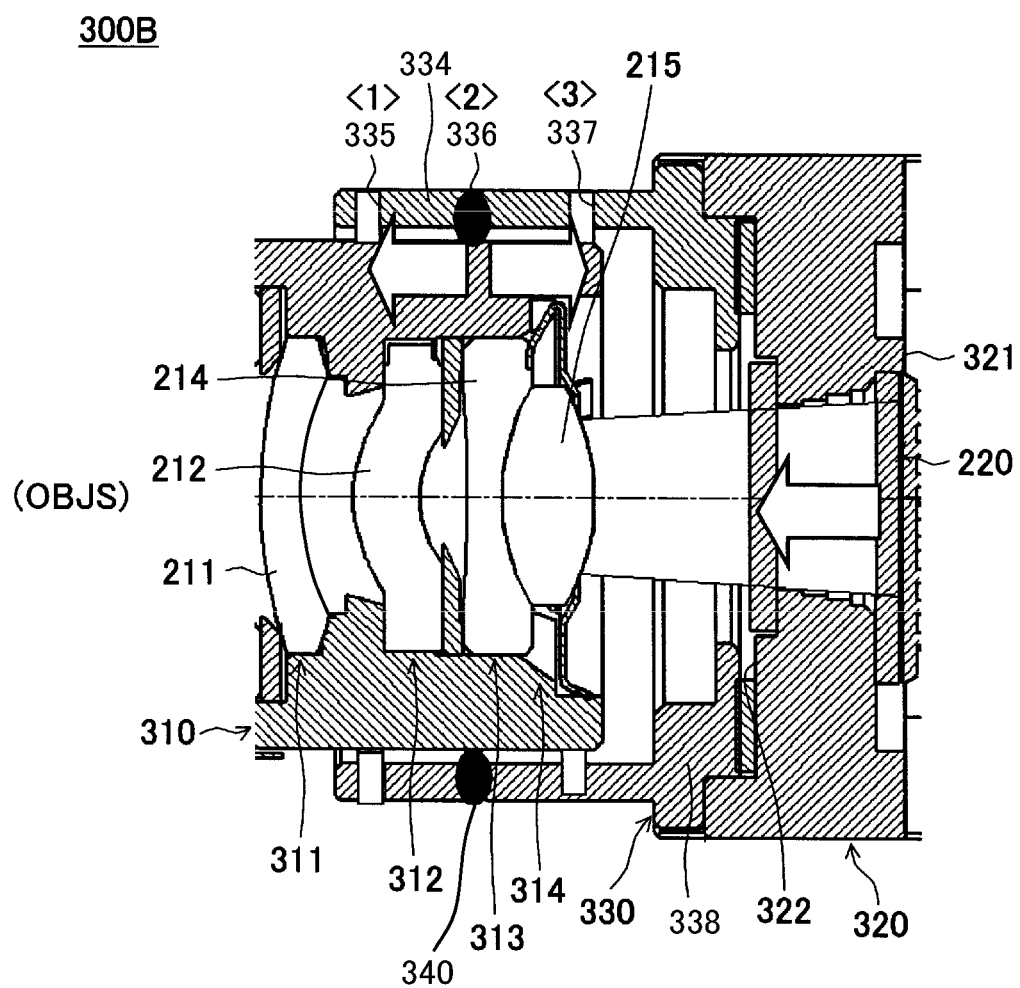
FIG. 12 is a diagram showing an example of the constitution of a lens frame structure according to the present second embodiment.
Figure 13:
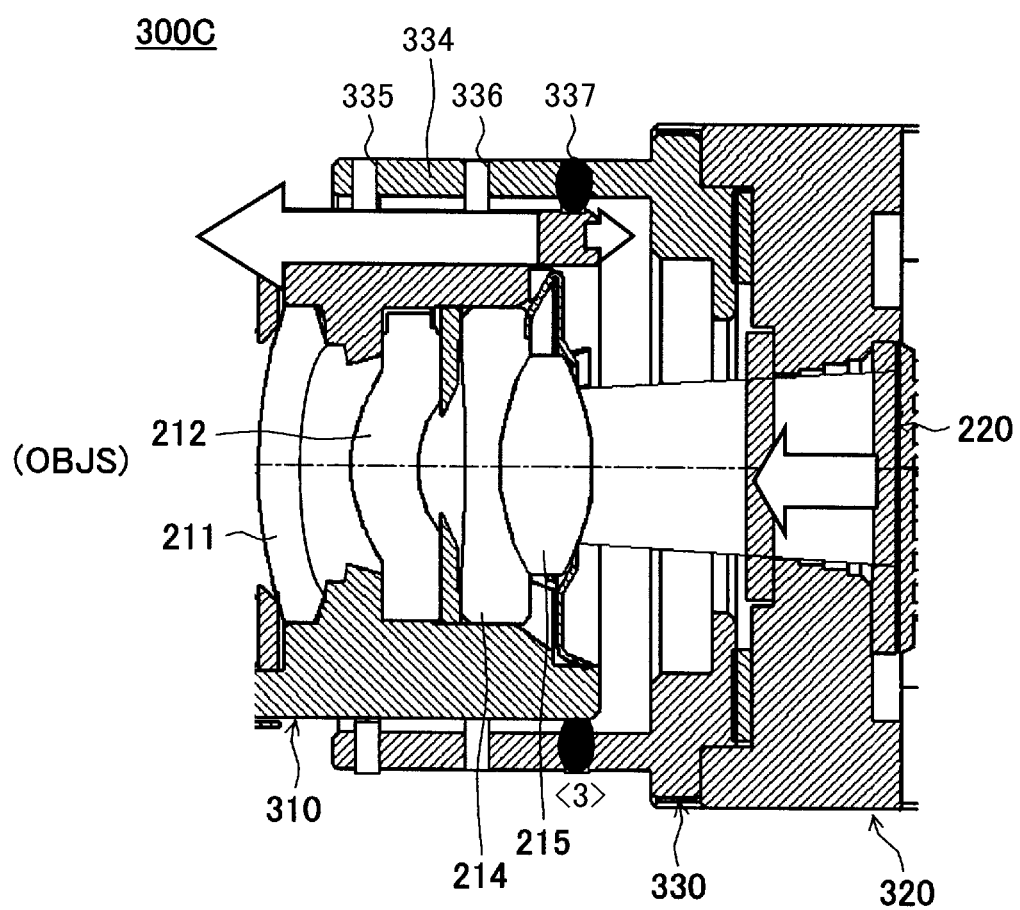
FIG. 13 is a first diagram for explaining a fastening method of the lens frame structure according to the present second embodiment.
Figure 14:
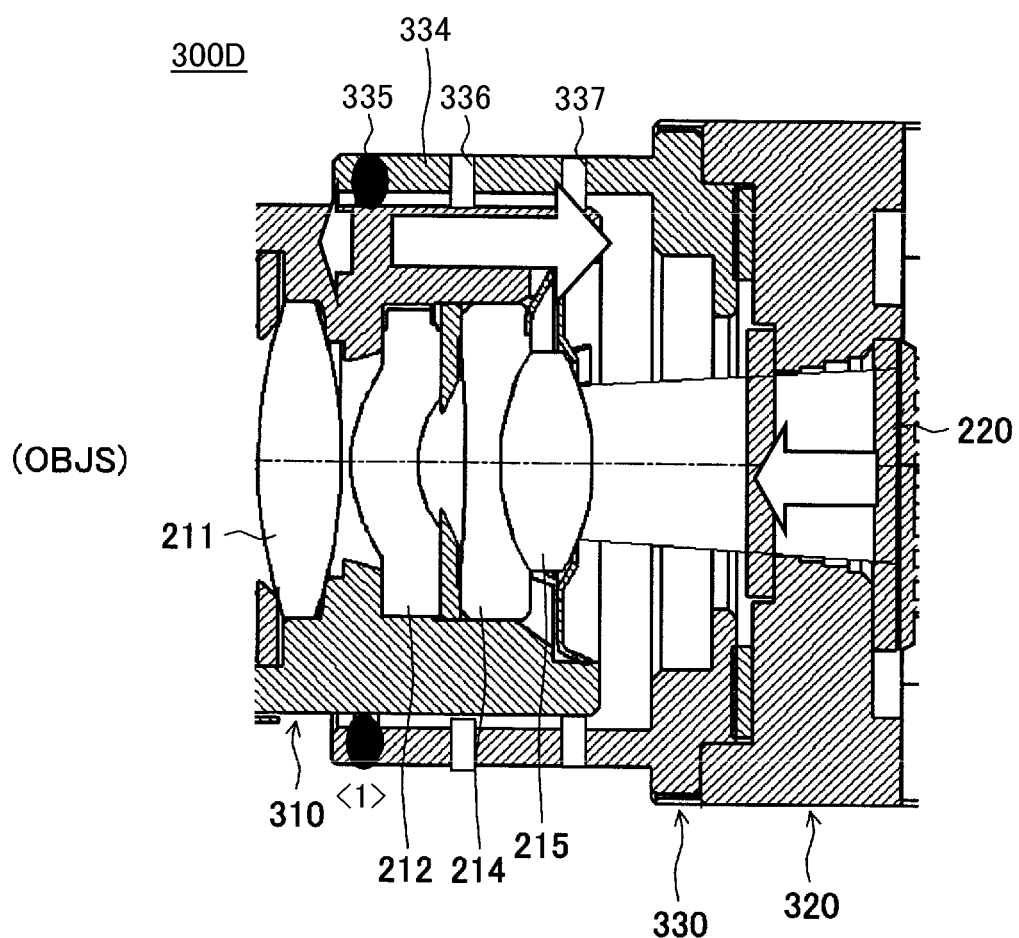
FIG. 14 is a second diagram for explaining the fastening method of the lens frame structure according to the present second embodiment.

The lens frame structures 300B, 300C, and 300D in the present second embodiment are basically configured so that, as shown in FIG. 12, FIG. 13, and FIG. 14, the lens holding part 310 and the imaging element holding part 320 are separately constituted, these lens holding part 310 and imaging element holding part 320 are fastened by the intermediate member 330, and fastening positions of the lens holding part 310 and the imaging element holding part 320 can be adjusted by the intermediate member 330.

By controlling these fastening positions, back focus positional deviation is controlled and sufficient performance can be secured even when covering a variety of needs such as a stress on low temperature or a stress on high temperature in the usage environment. Further, in a DEOS (depth expansion optical system), the device is constituted so that the change of the depth of field due to temperature can be eased as well.

The lens holding part 310 is formed in for example a cylindrical shape. From the object side, the first holding part 311 holding the first lens 211, the second holding part 312 holding the second lens 212, the third holding part 313 holding the third lens 214, and the fourth holding part 314 holding the fourth lens 215 are sequentially formed.

Further, the side of the outside portion of the lens holding part 310 closer to the object than the center in the axial direction is fastened to one end portion of the intermediate member 330 by for example a binder 340.

The lens holding part 310 is formed by for example plastic.

The imaging element holding part 320 is formed in a cylindrical shape having an outer diameter larger than the outer diameter of the lens holding part 310, the center portion is opened in the axial direction, and the imaging element 220 is fastened to the bottom surface side (first surface side) 321.

Further, one end portion 331 of the intermediate member 330 is fastened to the top surface side (object side surface) 322 of the imaging element holding part 320 by a binder or the like.

The imaging element holding part 320 is formed by for example plastic.

The intermediate member 330 is formed in a cylindrical shape having an inner diameter larger than the outer diameter of the lens holding part 310. On a side wall 334 thereof, fastening parts 335 to 337 formed by a plurality of (three in the present embodiment) through-holes are formed in the axial direction at predetermined distances. Several fastening parts 335 to 337 each are formed at predetermined distances on the circumference.

Further, the other end portion of the intermediate member 330 has a flange part 338 formed so as to extend to the inner side, while the outer side surface (bottom surface) of this flange part 338 is fastened so as to abut against the top surface side 322 of the imaging element holding part 320.

This intermediate member 330 is formed by for example plastic or metal, for example, aluminum (Al)

In this way, the lens frame structures 300B, 300C, and 300D of the present second embodiment have a mechanism where the imaging element holding part 320 and the lens holding part 310 are fastened, the optical system has a fixed focal point, and positional fluctuation of the back focus due to a temperature change can be eased without having a drive mechanism.

Further, it has a mechanism where the back focus at ordinary temperature is not changed, but the lens unit can handle a high temperature to a low temperature by making the fastening positions of the lens holding part 310 and the imaging element holding part 320 variable.

Further, in the present second embodiment, the device is constituted so that when the sum of power of the plastic lenses included in the optical system 210 is negative, the distance between the surface on the imaging element 220 side of the fourth lens 215 forming the last lens and the imaging element 220 becomes shorter at a temperature higher than ordinary temperature and becomes longer at a temperature lower than ordinary temperature.

Further, in the present second embodiment, the device is constituted so that, when the sum of power of the plastic lenses included in the optical system 210 is positive, the distance between the surface on the imaging element 220 side of the fourth lens 215 forming the last lens and the imaging element 220 becomes longer at a temperature higher than ordinary temperature and becomes shorter at a temperature lower than ordinary temperature.

In this way, the present second embodiment is configured to keep down the power of the plastic lenses at the time of lens design and thereby suppress fluctuations of the plastic lenses due to temperature and, further, so that the lens holding part 310 and the imaging element holding part 320 are separate. It is configured to make fastening positions of the lens holding part 310 and the imaging element holding part 320 by the intermediate member 330 variable so that the deterioration of performance caused by back focus fluctuation due to temperature is suppressed.

Here, design considering temperature which changes the fastening positions of the imaging element holding part 320 and the lens holding part 310 will be explained.

For example, in the mechanisms of the lens frame structures 300B, 300C, and 300D in which three fastening positions can be adjusted as in FIG. 12 to FIG. 14, as the design of the lenses, it is assumed that the performance can be secured in a temperature region from ordinary temperature to a certain temperature at the position of the <2> (fastening part 336). Even when the temperature becomes high, based on the standard of the fastening positions, the distance between the last lens surface, that is, the surface of the fourth lens 215, and the imaging element surface suitably becomes short. Note, in the case of lenses where the sum of power of plastic lenses becomes strongly positive, the back serving as the lens frame expands at a high temperature, so the positive power as the lens becomes weak and the back focus becomes long. In that case, as shown in FIG. 13, preferably it is fastened to the position of the <3>(fastening part 337).

When it is fastened to the position of <3>, the distance from the last lens surface up to the imaging element is not cancelled out.

In a case of lenses where the sum of power of plastic lenses becomes strongly negative, the back serving as the lens frame expands at a high temperature, so the negative power as the lens becomes weak and the back focus becomes short.

In that case, as shown in FIG. 14, preferably it is fastened to the position of the <1> (fastening part 335). When it is fastened to the position of <1>, the distance between the surface of the fourth lens 215 forming the last lens surface and the imaging element 220 is cancelled out, and the back focus can be made further shorter.

Note that, in the constitution of FIG. 12, as the plastic of the lens holding part 310, for example, PCGF20 (linear expansion coefficient 0.000065) is assumed. For this lens holding part 310, preferably, for example, the plastic is made to contain a glass to control the linear expansion coefficient, and the fastening position is made variable.

Note that, in the present second embodiment, it is also possible to use a fastening method using a binder which is cured by irradiating UV-rays. Further, it is also possible to use a fastening method using screws.

In the case where a fastening method using a binder is used, the parts can be fastened after freely adjusting the lens holding part (barrel) (for example, after adjusting it in a direction not parallel to the optical axis as well). If a fastening method using screws is used, the influence of aging which may occur when a binder is used can be suppressed.

Figure 15:
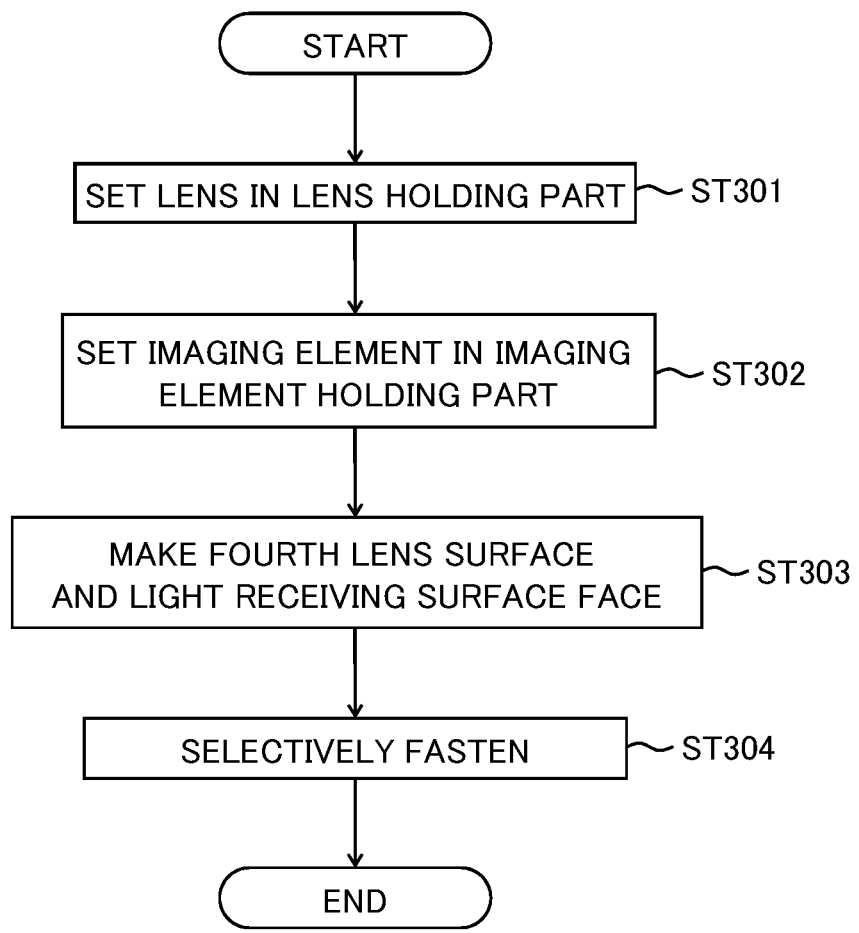
FIG. 15 is a flow chart for explaining basic procedure of the method of production according to the present embodiment.

The lens and imaging element having the constitutions as described above are basically produced by assembly of parts according to the procedures shown in FIG. 15.

<First Step ST301>

Lenses of the optical system including lenses of both glass and plastic are set in the lens holding part 310. In the present embodiment, from the object side, the first lens 211, second lens 212, third lens 214, and fourth lens 215 are sequentially arranged in the lens holding part 310.

<Second Step ST302>

The imaging element 220 is set in the imaging element holding part 320.

Note that, the order of the first step ST301 and second step ST302 may be switched with either before or after the other.

<Third Step ST303>

The surface on the imaging element side of the fourth lens 215 forming the last lens which is arranged at the proximate side of the imaging element side and the light receiving surface of the imaging element 220 are made to face each other.

<Fourth Step ST304>

The lens holding part 310 and the imaging element holding part 320 are selectively fastened at positions where the fluctuation of the position of back focus due to a temperature change can be relatively absorbed.

In the present embodiment, these are fastened by using the intermediate member 330.

Note that, the processing of step ST303 explained above is processing linked with the second embodiment of the present invention shown in FIG. 12 to FIG. 14.

As the processing linked with the first embodiment of the present invention shown in FIG. 10 and FIG. 11, it is possible to select the fastening positions or materials (linear expansion coefficients) of the lens holding part 310 and the imaging element holding part 320 so as to fasten these so that fluctuation of the position of the back focus due to a temperature change can be relatively absorbed.

At the fourth step ST304, the lens holding part 310 and the imaging element holding part 320 are selectively fastened so that when the sum of power of plastic lenses included in the optical system 210 is negative, the distance between the surface on the imaging element side of the fourth lens 215 forming the last lens which is arranged at the proximate side of the imaging element side and the imaging element 220 becomes shorter at a temperature higher than ordinary temperature and becomes longer at a temperature lower than ordinary temperature.

Alternatively, at the fourth step ST304, the lens holding part 310 and the imaging element holding part 320 are selectively fastened so that when the sum of power of plastic lenses included in the optical system 210 is positive, the distance between the surface on the imaging element side of the fourth lens 215 forming the last lens which is arranged at the proximate side of the imaging element side and the imaging element 220 becomes longer at a temperature higher than ordinary temperature and becomes shorter at a temperature lower than ordinary temperature.

Below, Examples 1 and 2 showing concrete numerical values of the imaging lens unit 210A will be shown.

Note that, in Examples 1 and 2, the lenses 211, 212, 214, and 215 constituting each lens group of the imaging lens unit 210A and the cover glass 221 constituting the imaging element 220 were given surface numbers as shown in FIG. 6.

EXAMPLE 1

The numerical values of Example 1 are shown in Table 1 and Table 2. The numerical values of the example are for the imaging lens unit 210A of FIG. 6. Table 1 shows curvature radii (R: mm), distances (D: mm), refractive indexes (N), and dispersion values (V) of the stop, lenses, and cover glass corresponding to the surface numbers of the imaging lenses in Example 1.

TABLE 1

(Example 1)

|   | Curvature radius | | Distance | Refractive index | | Dispersion value | |
|---|---|---|---|---|---|---|---|
|   | Example | Object | 125.0 | | | | |
| 1 | R1 | 3.6 | D1 | 0.9 | N1 1.608 | V1 | 33.7 |
| 2 | R2 | 1.444 | D2 | 0.382 | | | |
| 3 | R3 | 1.82 | D3 | 1.3423 | N2 1.607 | V2 | 26.9 |
| 4 | R4 | 2.933 | D4 | 0.18 | | | |
|   | Stop distance | | | 0.227 | | | |
| 5 | R5 | −10.6 | D5 | 0.7 | N3 1.706 | V3 | 26.9 |
| 6 | R6 | 3.13 | D6 | 1.6 | N4 1.773 | V4 | 49.6 |
| 7 | R7 | −2.91 | D7 | 4.57 | | | |
| 8 | R8 | 0.0 | D8 | 0.5 | Glass | | |
| 9 | R9 | 0.0 | | | | | |

Table 2 shows aspherical coefficients of predetermined surfaces of the initial first lens 211, second lens 212, third lens 213, and fourth lens 215 including aspherical surfaces in Example 1. In Table 2, k represents a conical constant, A represents a fourth order aspherical coefficient, B represents a sixth order aspherical coefficient, C represents an eighth order aspherical coefficient, and D represents a 10th order aspherical coefficient. Further, α and β are phase surface coefficients, and x and y are directions shown in FIG. 6.

TABLE 2

Aspherical equation (Example 1)

$$Z = \frac{ch^2}{1 + \sqrt{1 - (1+k)c^2h^2}} + Ah^4 + Bh^6 + Ch^8 + Dh^{10} + \alpha(x^3 + y^3) + \beta(x^5 + y^5)$$

| Example Conical constant k | | A | B | C | D |
|---|---|---|---|---|---|
| 1 | | | | | |
| 2 | | | | | |
| 3 | | 0.5226 | −0.0005 | | |
| 4 | | 5.828 | −0.0071 | −0.0043 | |
| 5 | | | | | |
| 6 | | | | | |
| 7 | | | | | |

Only fourth surface α = −0.00165 β = 0.0217
First lens focal distance: −4.73
Second lens focal distance: 5.47
Focal distance of third and fourth combined lenses: 4.20

EXAMPLE 2

Figure 16:
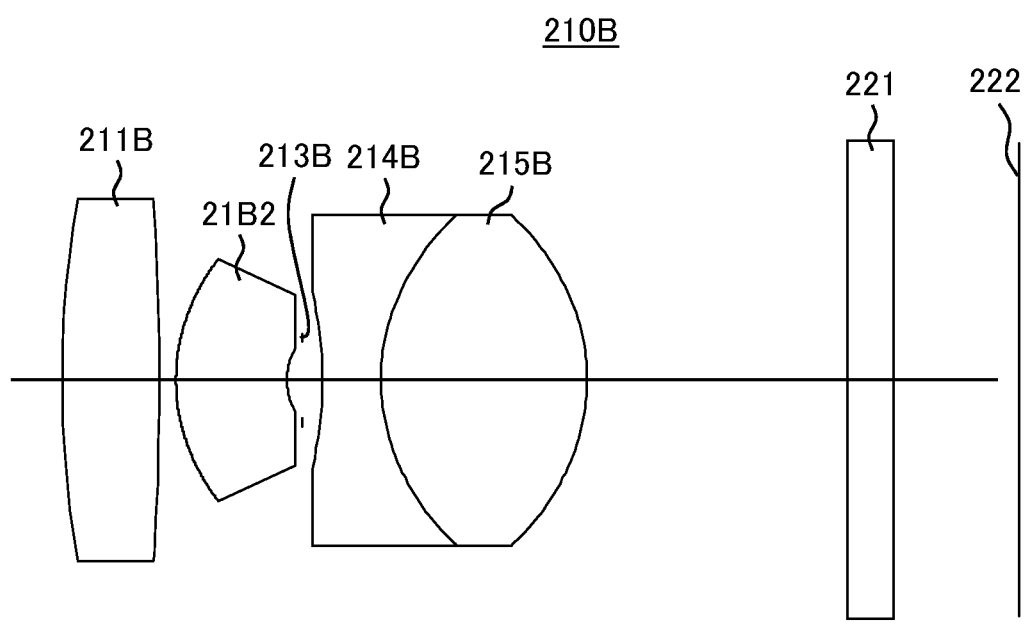
FIG. 16 is a diagram showing the basic configuration of an imaging lens unit of Example 2.

The numerical values of Example 2 are shown in Table 3 and Table 4. The numerical values of the examples are for an imaging lens unit 110B of FIG. 16. Table 3 shows the curvature radii (R: mm), distances (D: mm), refractive indexes (N), and dispersion values (V) of the stop, lenses, and cover glass corresponding to surface numbers of the imaging lens in Example 2.

TABLE 3

(Example 2)

|   | Curvature radius | | Distance | Refractive index | | Dispersion value | |
|---|---|---|---|---|---|---|---|
|   | Example | Object | 125.0 | | | | |
| 1 | R1 | 18.22 | D1 | 1.16 | N1 1.805 | V1 | 25.4 |
| 2 | R2 | −52.04 | D2 | 0.2 | | | |
| 3 | R3 | 3.235 | D3 | 1.325 | N2 1.607 | V2 | 26.9 |
| 4 | R4 | 2.2 | D4 | 0.18 | | | |
|   | Stop distance | | | 0.243 | | | |
| 5 | R5 | −6.6 | D5 | 0.7 | N3 1.752 | V3 | 25.0 |
| 6 | R6 | 3.53 | D6 | 2.464 | N4 1.883 | V4 | 40.8 |
| 7 | R7 | −3.53 | D7 | 3.112 | | | |
| 8 | R8 | 0.0 | D8 | 0.5 | Glass | | |
| 9 | R9 | 0.0 | | | | | |

Table 4 shows aspherical coefficients of predetermined surfaces of the first lens 211, second lens 212, third lens 213, and fourth lens 215 including aspherical surfaces in Example 2. In Table 4, k represents a conical constant, A represents a fourth order aspherical coefficient, B represents a sixth order aspherical coefficient, C represents an eighth order aspherical coefficient, and D represents a 10th order aspherical coefficient. Further, α and β are phase surface coefficients, and x and y are directions shown in FIG. 6.

TABLE 4

Aspherical equation (Example 2)

$$Z = \frac{ch^2}{1 + \sqrt{1 - (1+k)c^2h^2}} + Ah^4 + Bh^6 + Ch^8 + Dh^{10} + \alpha(x^3 + y^3) + \beta(x^5 + y^5)$$

| Example Conical constant k | | A | B | C | D |
|---|---|---|---|---|---|
| 1 | | | | | |
| 2 | | | | | |
| 3 | | 0.1357 | | | |
| 4 | | 0.9822 | | | |
| 5 | | | | | |
| 6 | | | | | |
| 7 | | | | | |

Only fourth surface α = −0.00165 β = 0.0217
First lens focal distance: 17.0
Second lens focal distance: −22.0
Focal distance of third and fourth combined lenses: 4.73

Examples of refractive index fluctuation due to the linear expansion coefficients are shown in Table 5 and Table 6.

TABLE 5

|   | Refractive index at 25° C. | Linear expansion coefficient |
|---|---|---|
| Plastic | 1.5304 | 0.00007 |
| Glass | 1.8042 | 0.0000063 |

TABLE 6

| | Refractive index after change | | | | | |
|---|---|---|---|---|---|---|
| | Temperature (° C.) | | | | | |
| | −30 | 0 | 20 | 25 | 45 | 70 |
| | | | Temperature change (25° C. standard) | | | |
| | −55 | −25 | −5 | 0 | 20 | 45 |
| Plastic | 1.5365261 | 1.533185 | 1.530957 | 1.5304 | 1.528172 | 1.525388 |
| Glass | 1.805036 | 1.80458 | 1.804276 | 1.8042 | 1.803896 | 1.803516 |

It is seen from this that, when the temperature changes, the fluctuation of the refractive index of plastic is much larger than that of glass.

From the above, when the second lens 212 is made of plastic, even in a case where fluctuation of the refractive index occurs due to the temperature, since the power of the second lens of Example 2 is suppressed, the fluctuation of the back focus position due to temperature can be eased.

In the present embodiment, as shown in Examples 1 and 2, it is possible to realize an imaging lens unit having an excellent image forming performance.

Below, the configurations and functions of the optical system and image processing device of the present embodiment will be specifically explained.

Next, the filter processing of the image processing device 240 will be explained.

In the present embodiment, there is an optical lens regularly dispersing light beams converged by the optical system 210. By inserting this phase plate, an image not focused anywhere on the imaging element 220 is realized.

In other words, light beams having a deep depth (playing a central role in the image formation) and flare (blurred portion) are formed by the optical system 210.

As explained before, a means for restoring this regularly dispersed image to a focused image by digital processing without moving the optical system 210 is referred to as a "wavefront aberration control optical system" or "depth expansion optical system (DEOS)". This processing is carried out in the image processing device 240.

Here, the basic principle of the DEOS will be explained.

Figure 17:
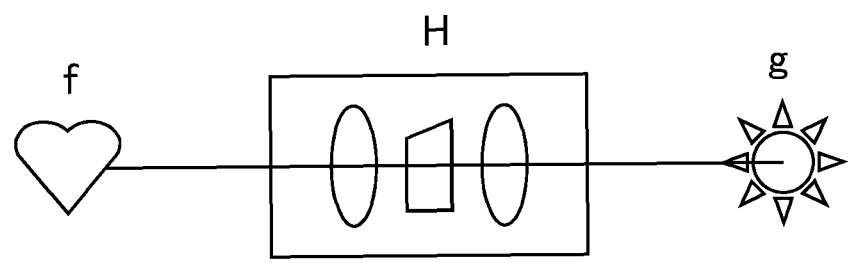
FIG. 17 is a diagram for explaining the principle of DEOS.

As shown in FIG. 17, an image g is generated by an image f of the object entering into the DEOS optical system H.

This is represented by the following equation.

$$g = H * f \quad \text{(Equation 3)}$$

where, * represents convolution.

In order to find the object from the generated image, the next processing is required.

$$f = H^{-1} * g \quad \text{(Equation 4)}$$

Here, the kernel size and operational coefficients concerning H will be explained.

Assume that the individual zoom positions are Zpn, Zpn−1, . . . Further, assume that the H functions thereof are Hn, Hn−1, . . . .

The spot images are different, therefore the H functions become as follows:

$$Hn = \begin{pmatrix} a & b & c \\ d & e & f \end{pmatrix} \quad \text{[Equation 5]}$$

-continued $$Hn - 1 = \begin{pmatrix} a' & b' & c' \\ d' & e' & f' \\ g' & h' & i' \end{pmatrix}$$

The difference of the number of rows and/or the number of columns of this matrix is referred to as the "kernel size". The numbers are the operational coefficients.

Here, the H functions may be stored in a memory. Further, the PSF may be defined as a function of the object distance and computed according to the object distance to thereby enable setting so that the optimal filter is formed for any object distance by calculating the H function. Further, the H function may be directly found according to the object distance using the H function as the function of the object distance.

In the present embodiment, as shown in FIG. 5, the device is configured so that an image from the optical system 210 is received at the imaging element 220 and is input to the image processing device 240 at the time of opening of the stop, a conversion coefficient in accordance with the optical system is acquired, and a dispersion-free image signal is generated from a dispersed image signal from the imaging element 220 by using the acquired conversion coefficient.

In the present embodiment, a DEOS is employed, so it is possible to obtain a high definition image quality. In addition, the optical system can be simplified, and the cost can be reduced.

Figure 18:
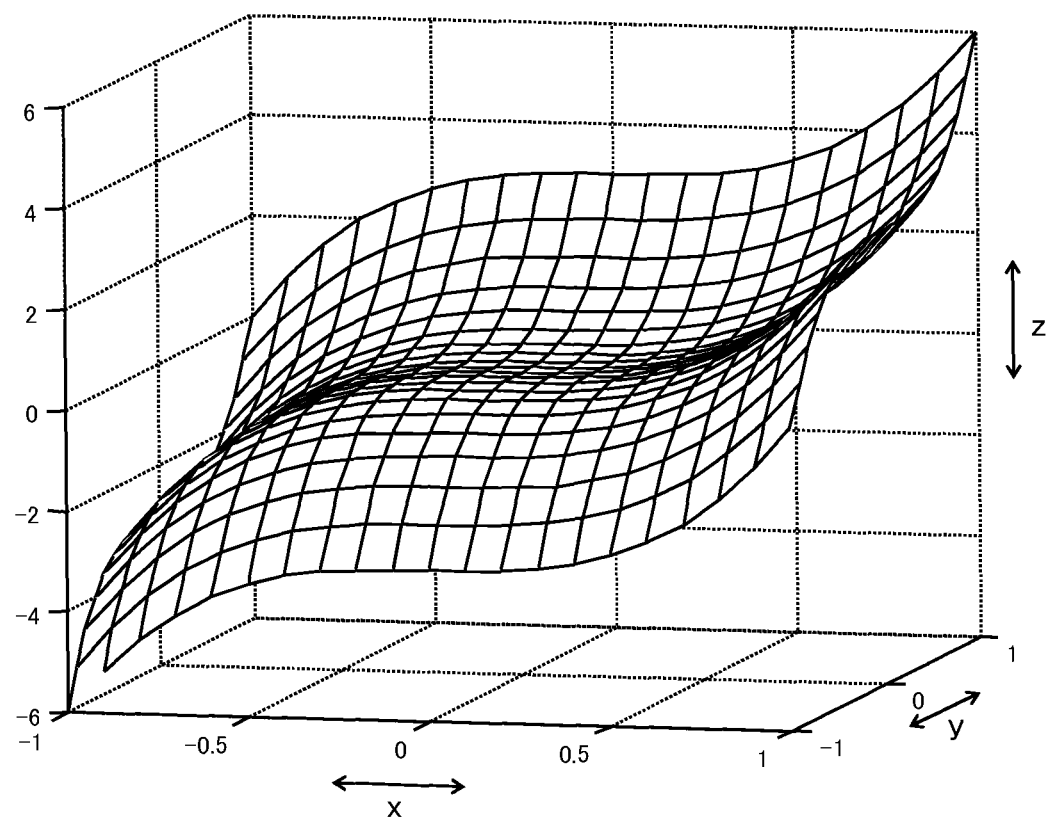
FIG. 18 is a diagram showing a shape of a wavefront aberration represented by equation where an optical axis of an optical system including an optical wavefront modulation element of the present embodiment is plotted on a z-axis, and two axes orthogonal to each other are defined as x and y.

FIG. 18 shows the shape of the wavefront aberration represented by the following equation when the optical axis of the optical system including the optical wavefront modulation element of the present embodiment is plotted on the z-axis, and two axes orthogonal to each other are defined as x and y.

$$Z = \alpha(x^3 + y^3) \quad \text{[Equation 6]}$$

where, $|x| \leq 1$, $|y| \leq 1$, and Z represents the wavefront aberration.

The change of the phase is small in a range where the wavefront aberration is $0.5\lambda$ or less, so the optical system has an OTF no different from that of the usual optical system. Accordingly, the attachment position is adjusted to reduce the wavefront aberration to about $0.5\lambda$.

Figure 19:
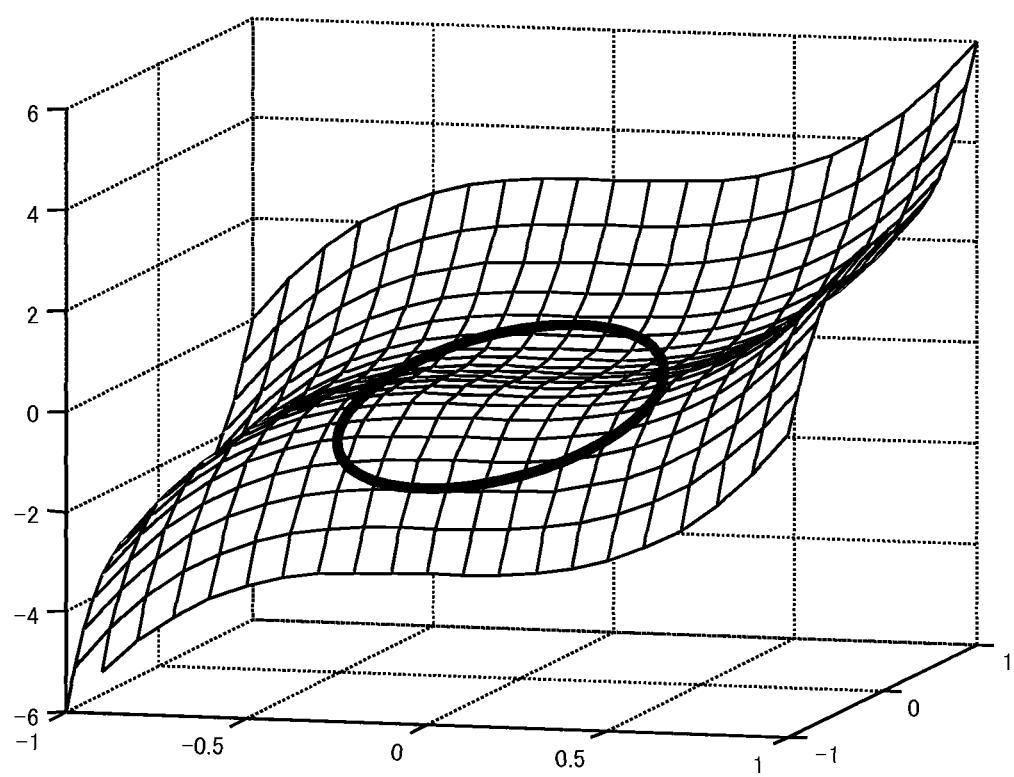
FIG. 19 is a diagram representing the shape of the wavefront aberration and a range not more than 0.5λ by a bold line.

FIG. 19 shows the shape of the wavefront aberration described and the range not more than $0.5\lambda$ by a bold line.

Note, for $\lambda$, use is made of for example the wavelengths of the visible light region and infrared ray region.

Note that, the shape shown in FIG. 18 is an example. Other shape may be applied so far as the phase of the optical wavefront modulation element is represented by the following equation when the optical axis of the optical system is plotted on the z-axis, and two axes orthogonal to each other are defined as x and y.

$$z = \exp\left\{i \times \left(\sum_{j=1} C_j x^m y^n\right)\right\} \quad \text{[Equation 7]}$$

where, $n$ and $m$ are integers, $$j = \frac{[(m+n)^2 + m + 3n]}{2}, |x| \leq 1, |y| \leq 1$$

The image processing device 240, as explained above, receives the first order image FIM from the imaging element 220, applies processing etc. to expand the depth of field by convolution processing by the filter, and forms a high definition final image FNLIM.

The configuration and processing of the image processing device 240 will be explained next.

The image processing device 240, as shown in FIG. 5, has a raw buffer memory 241, convolution computer 242, kernel data storage ROM 243 serving as the storing means, and convolution control part 244.

The convolution control part 244 turns the convolution processing on/off, controls the screen size, switches kernel data, and so on and is controlled by a control device 290.

Further, the kernel data storage ROM 243, as shown in FIG. 20, FIG. 21, or FIG. 22, stores kernel data for convolution calculated according to the point spread functions (PSF) of optical systems prepared in advance. Exposure information determined at the time of setting the exposure is acquired by the control device 290, and the kernel data is selected and controlled through the convolution control part 244.

Note that, the exposure information includes stop information.

In the example of FIG. 20, the kernel data A is data corresponding to an optical magnification (×1.5), the kernel data B is data corresponding to an optical magnification (×5), and the kernel data C is data corresponding to an optical magnification (×10).

Further, in the example of FIG. 21, the kernel data A is data corresponding to an F number (2.8) serving as the stop information, and the kernel data B is data corresponding to an F number (4). Note that an F number (2.8) and an F number (4) are out of the range of 0.55λ described above.

Further, in the example of FIG. 22, the kernel data A is data corresponding to an object distance information of 100 mm, the kernel data B is data corresponding to an object distance of 500 mm, and the kernel data C is data corresponding to an object distance of 4 m.

Figure 23:
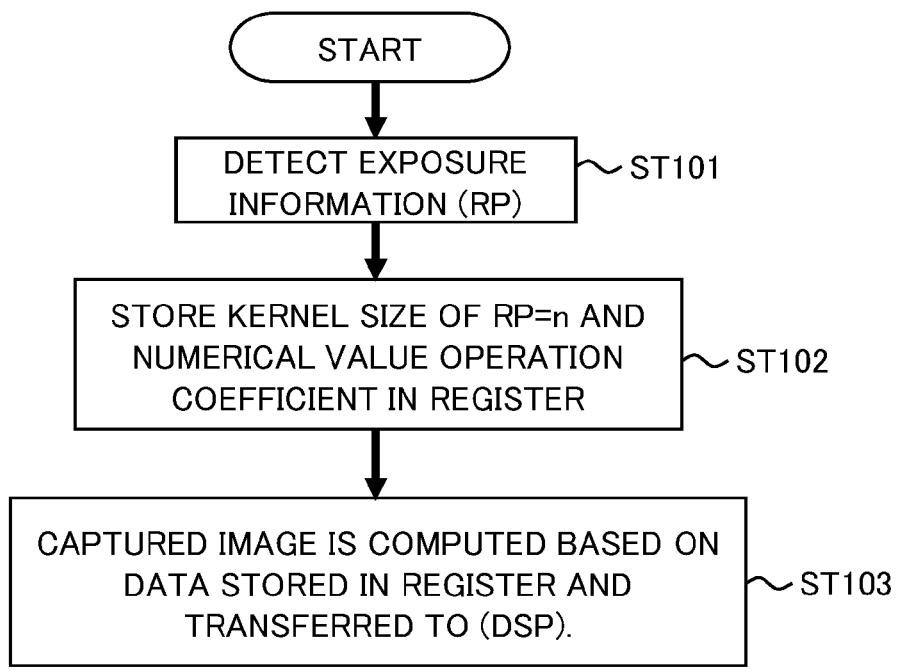
FIG. 23 is a flow chart schematically showing processing for setting the optical system of an exposure control device.

FIG. 23 is a flow chart of switch processing according to the exposure information (including the stop information) of the control device 290.

First, the exposure information (RP) is detected and supplied to the convolution control part 244 (ST101).

At the convolution control part 244, a kernel size and a numerical value operational coefficient are set in the register from the exposure information RP (ST102).

Further, a convolution operation is carried out based on the data stored in the register for the image data which was captured at the imaging element 220 and input to the two-dimensional convolution operation part 242 through the AFE 230, while the computed and converted data is transferred to the camera signal processing part 250 (ST103).

Below, a further concrete example of the signal processing part and kernel data storage ROM of the image processing device 240 will be explained.

Figure 24:
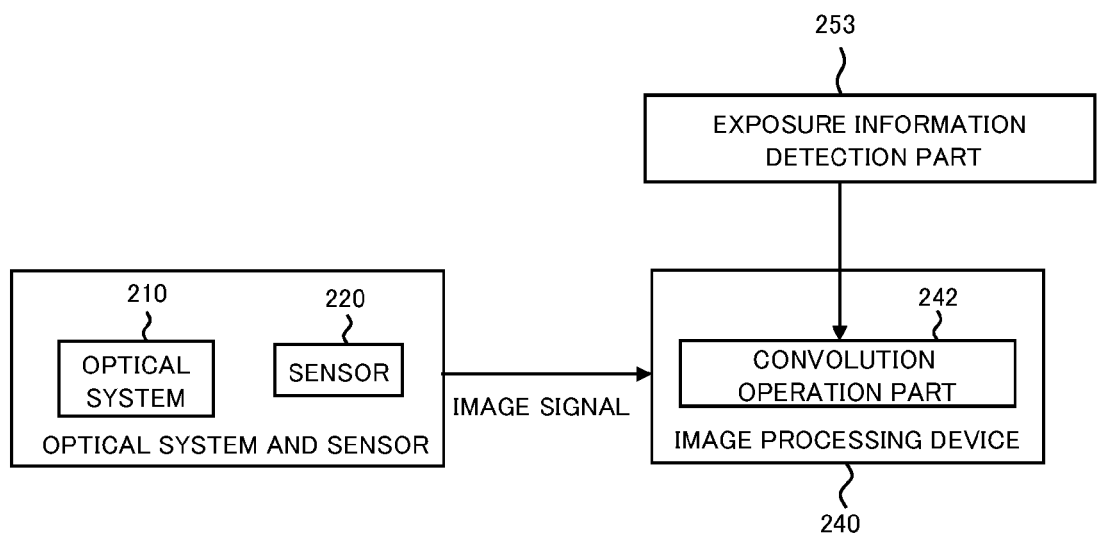
FIG. 24 is a diagram showing a first example of the configuration of a signal processing part and a kernel data storage ROM.

FIG. 24 is a diagram showing a first example of the configuration of the signal processing part and the kernel data storage ROM. Note that, the AFE etc. are omitted for simplification.

The example of FIG. 24 is a block diagram in a case where a filter kernel in accordance with the exposure information is prepared in advance.

The image processing device 240 acquires the exposure information determined at the time of setting the exposure from the exposure information detection part 252 and selects and controls the kernel data through the convolution control part 244. The two-dimensional convolution operation part 242 applies convolution processing by using the kernel data.

Figure 25:
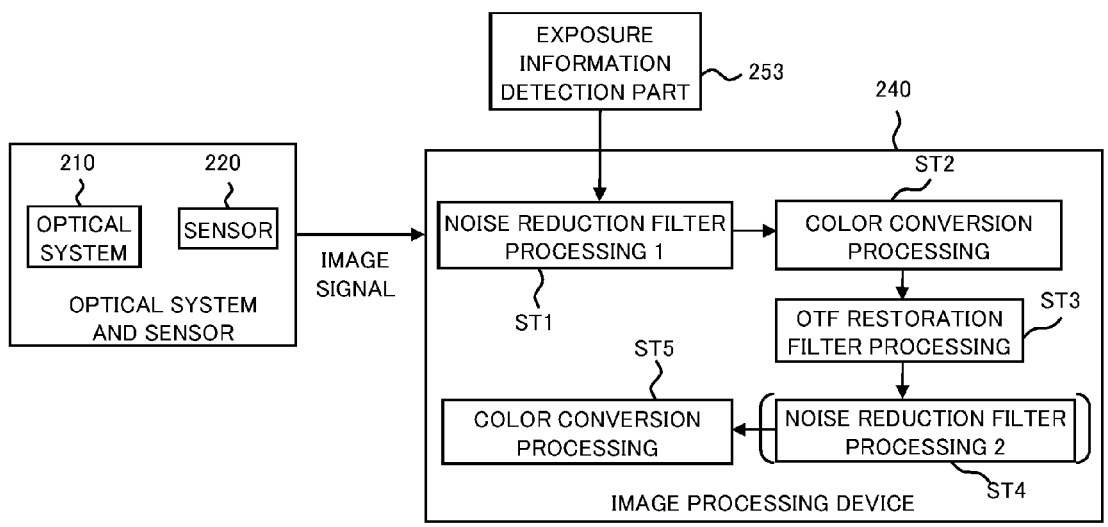
FIG. 25 is a diagram showing a second example of the configuration of a signal processing part and a kernel data storage ROM.

FIG. 25 is a diagram showing a second example of the configuration of the signal processing part and the kernel data storage ROM. Note that, the AFE etc. are omitted for simplification.

The example of FIG. 25 is a block diagram in a case where a step of noise reduction filter processing is provided at the start of the image processing device 240, and noise reduction filter processing ST1 in accordance with the exposure information is prepared in advance as the filter kernel data.

The exposure information determined at the time of setting the exposure is acquired by the exposure information detection part 253, while the kernel data is selected and controlled through the convolution control part 244.

The two-dimensional convolution operation part 242 applies the noise reduction filter ST1, then converts a color space by color conversion processing ST2, and then applies convolution processing (OTF restoration processing) ST3 by using the kernel data.

The part performs noise processing ST4 again and returns the color space to the original space by a color conversion processing ST5. As the color conversion processing, there can be mentioned, for example, YCbCr conversion. However, other conversion may be carried out as well.

Note that, repeat of the noise processing ST4 may be omitted.

Figure 26:
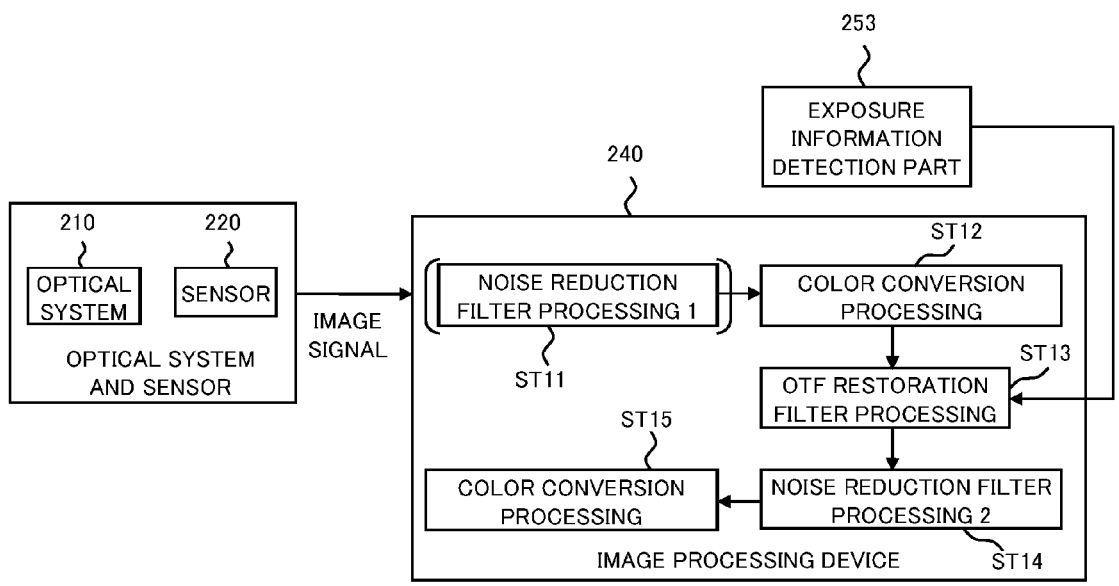
FIG. 26 is a diagram showing a third example of the configuration of a signal processing part and a kernel data storage ROM.

FIG. 26 is a diagram showing a third example of the configuration of the signal processing part and the kernel data storage ROM. Note that, the AFE etc. are omitted for simplification.

The example of FIG. 26 is a block diagram in a case where an OTF restoration filter using the exposure information is prepared in advance.

The exposure information determined at the time of setting the exposure is acquired by the exposure information detection part 253. The kernel data is selected and controlled through the convolution control part 244.

The two-dimensional convolution operation part 242 applies the convolution processing ST13 by using the OTF restoration filter after the noise reduction processing ST11 and color conversion processing ST12.

The part performs noise processing ST14 again and returns the color space to the original space by a color conversion processing ST15. As the color conversion processing, there can be mentioned, for example, YCbCr conversion. However, other conversion may be carried out as well.

Note that, either one of noise reduction processing ST11 or ST14 may be carried out alone as well.

Figure 27:
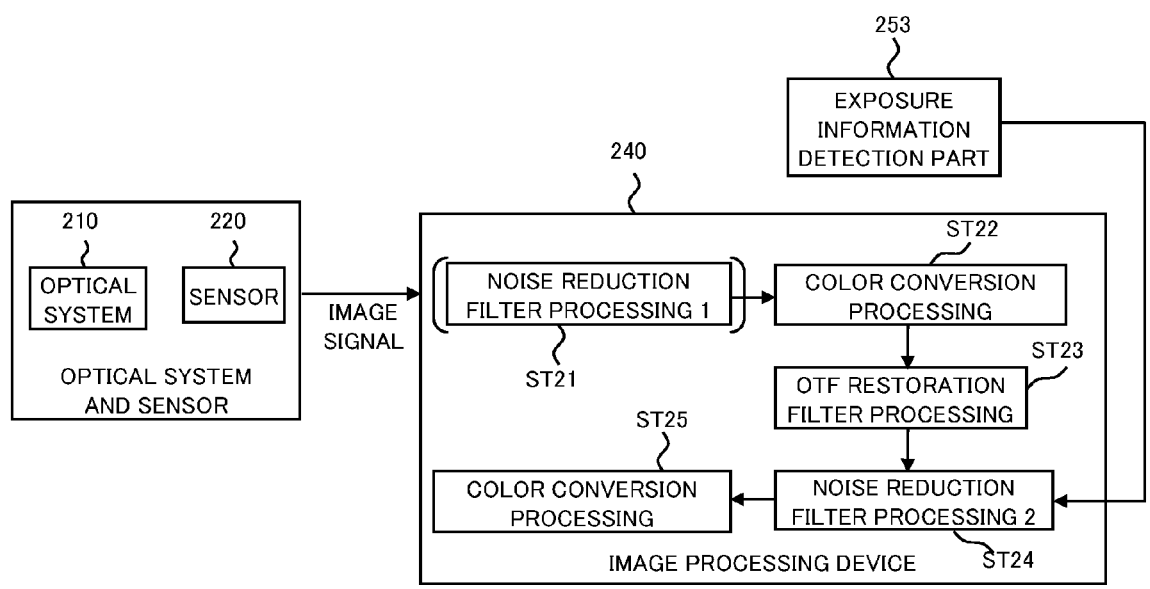
FIG. 27 is a diagram showing a fourth example of the configuration of a signal processing part and a kernel data storage ROM.

FIG. 27 is a diagram showing a fourth example of the configuration of the signal processing part and the kernel data storage ROM. Note that, the AFE etc. are omitted for simplification.

The example of FIG. 27 is a block diagram in a case where a step of noise reduction filter processing is provided, and a noise reduction filter in accordance with the exposure information is prepared in advance as the filter kernel data.

Note that, it is also possible to omit repeat of the noise processing ST4.

The exposure information determined at the time of setting the exposure is acquired. The kernel data is selected and controlled through the convolution control part 244.

The two-dimensional convolution operation part 242 applies noise reduction filter processing ST21, then converts the color space by a color conversion processing ST22, then applies a convolution processing ST23 by using the kernel data.

The part performs noise processing ST24 in accordance with the exposure information again and returns the color space to the original space by a color conversion processing ST25. As the color conversion processing, there can be mentioned, for example, YCbCr conversion. However, other conversion may be carried out as well.

Note that, it is also possible to omit the noise reduction processing ST21.

The example of performing the filter processing at the two-dimensional convolution operation part 242 in accordance with only the exposure information was explained above. However, it is possible to extract more suitable operational coefficients or perform operation by combining, for example, object distance information, zoom information, or imaging mode information with the exposure information.

Figure 28:
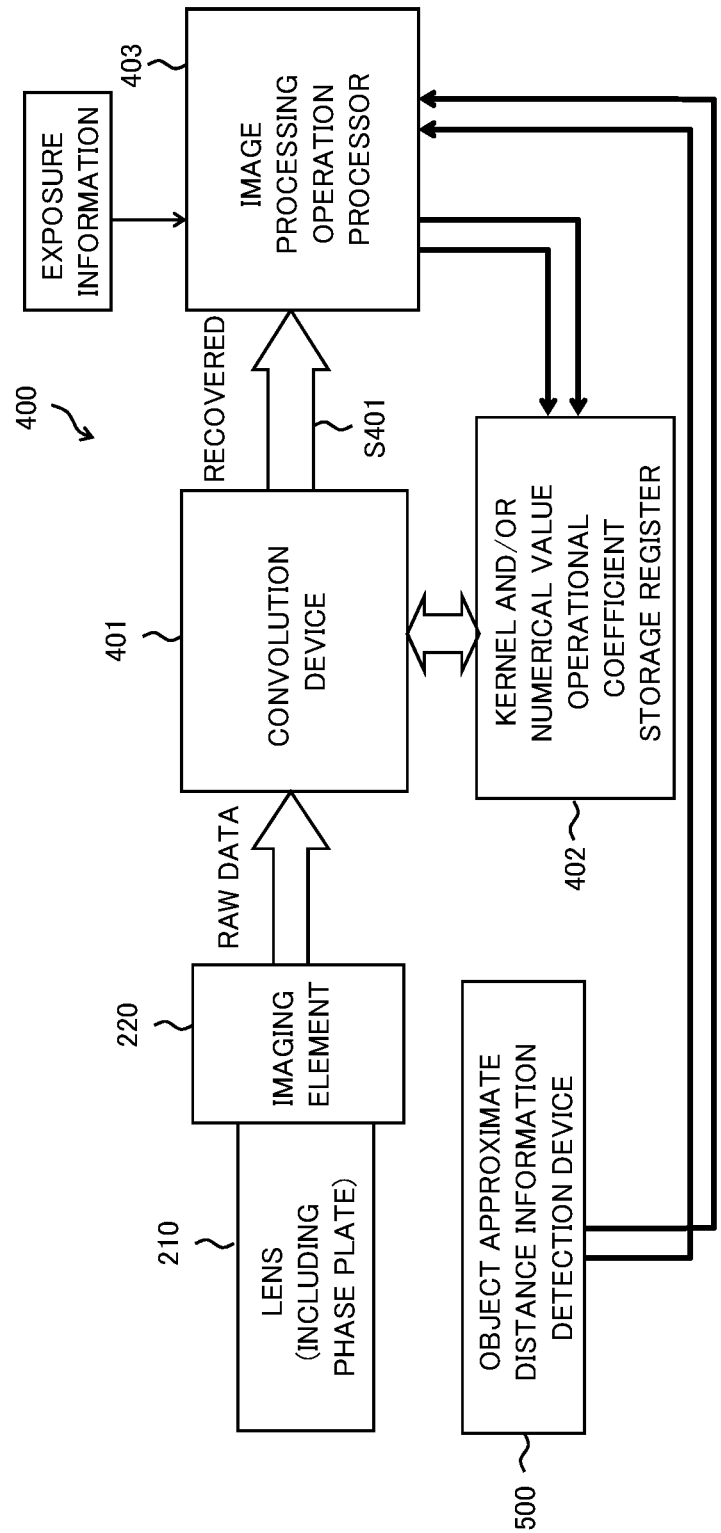
FIG. 28 is a diagram showing an example of the configuration of an image processing device combining object distance information and exposure information.

FIG. 28 is a diagram showing an example of the configuration of an image processing device combining the object distance information and the exposure information.

An image processing device 400, as shown in FIG. 28, has a convolution device 401, kernel and/or numerical value operational coefficient storage register 402, and image processing operation processor 403.

In this image processing device 400, the image processing operation processor 403 obtaining the information concerning the approximate distance of the distance of the object read out from the object approximate distance information detection device 500 and the exposure information stores the kernel size and its operational coefficient, which are used in the suitable computation of that object distance position, in the kernel and/or numerical value operational coefficient storage register 402, performs suitable computation at the convolution device 401 using those values for computation, and restores the image.

The present embodiment is configured to detect the distance up to the main object by the object approximate distance information detection device 500 including the distance detection sensor and perform processing for image correction differing in accordance with the detected distance.

The above image processing is carried out by a convolution operation. In order to accomplish this, for example, it is possible to employ a configuration commonly storing one type of operational coefficient of the convolution operation, storing in advance a correction coefficient in accordance with the focal length, correcting the operational coefficient by using this correction coefficient, and performing suitable convolution processing by the corrected operational coefficient.

Other than this configuration, it is possible to employ the following configurations.

It is possible to employ a configuration storing in advance the kernel size and the operational coefficient itself of the convolution in accordance with the focal length and performing a convolution operation by these stored kernel size and operational coefficient, a configuration storing in advance the operational coefficient in accordance with a focal length as a function, finding the operational coefficient by this function according to the focal length, and performing the convolution operation by the calculated operational coefficient, and so on.

When linked with the configuration of FIG. 28, the following configuration can be employed.

At least two conversion coefficients corresponding to aberration due to at least a plastic lens corresponding to the phase plate are stored in advance in the register 402 serving as the conversion coefficient storing means in accordance with the object distance. The image processing operation processor 403 functions as the coefficient selecting means for selecting a conversion coefficient in accordance with the distance up to the object from the register 402 based on the information generated by the object approximate distance information detection device 500 serving as the object distance information generating means.

Further, the convolution device 401 serving as the converting means converts the image signal according to the conversion coefficient selected at the image processing operation processor 403 serving as the coefficient selecting means.

Alternatively, as explained above, the image processing operation processor 403 serving as the conversion coefficient operation means computes the conversion coefficient based on the information generated by the object approximate distance information detection device 500 serving as the object distance information generating means and stores the same in the register 402.

Further, the convolution device 401 serving as the converting means converts the image signal according to the conversion coefficient obtained by the image processing operation processor 403 serving as the conversion coefficient operation means and stored in the register 402.

Alternatively, at least one correction value in accordance with the zoom position or zoom amount of the zoom optical system 210 is stored in advance in the register 402 serving as the correction value storing means. This correction value includes the kernel size of the object aberration image.

Further, based on the distance information generated by the object approximate distance information detection device 500 serving as the object distance information generating means, the image processing operation processor 403 serving as the correction value selecting means selects the correction value in accordance with the distance up to the object from the register 402 serving as the correction value storing means.

The convolution device 401 serving as the converting means converts the image signal based on the conversion coefficient obtained from the register 402 serving as the second conversion coefficient storing means and the correction value selected by the image processing operation processor 403 serving as the correction value selecting means.

As explained above, according to the present embodiment, the optical system 210 and imaging element 220 forming the first order image and the image processing device 240 forming the first order image to a high definition final image are included, the optical system 210 includes the first lens 211, second lens 212, stop 213, third lens 214, and fourth lens 215, the first lens 211, third lens 214, and fourth lens 215 are formed by glass, the second lens 212 is formed by plastic, and the powers are set so that the power of the plastic lenses is smaller than that of the power of the glass lenses and smaller in comparison with the power of the optical system 210, therefore sufficient performance can be secured even when the usage environment covers a range from low temperature to high temperature and, further, in a depth expansion optical system, the change of the depth of field due to temperature can be eased. Note that, in the present embodiment, the explanation was given of the case where only the second lens 212 was formed as a plastic lens. However, the same effects can be obtained so far as one or more of the second to fourth lenses are formed as plastic lenses, the power of each plastic lens is made smaller than the power of a glass lens, and a total power of the plastic lenses is made smaller than the power of the optical system.

Further, a number of lenses other than four lenses in the present embodiment may be used as well. However, the first lens 211 (object side lens) sometimes contacts the object or external air. Therefore, preferably it is formed as a glass lens for the purpose of preventing scratches and preventing corrosion. Further, by forming the fourth lens (imaging element side lens) as a glass lens, the plastic lenses is sealed by the glass lens in the mirror cylinder, therefore it becomes possible to improve the environmental tolerance effect.

Further, in the lens frame structures 300 and 300A in the present first embodiment, the lens holding part 310 and the imaging element holding part 320 are separately constituted, the lens holding part 310 and imaging element holding part 320 are fastened through the intermediate member 330, fastening positions of the lens holding part 310 and the imaging element holding part 320 can be adjusted by the intermediate member 330, the positional deviation of the back focus is controlled by controlling these fastening positions, and sufficient performances can be secured even when the usage environment covers a variety of needs stressing a low temperature to a high temperature. Further, in a DEOS (depth expansion optical system), the change of the depth of field due to temperature can be eased as well.

Further, in the lens frame structures 300B and 300C in the present second embodiment, the lens holding part 310 and the imaging element holding part 320 are separately constituted, the lens holding part 310 and imaging element holding part 320 are fastened through the intermediate member 330, fastening positions of the lens holding part 310 and the imaging element holding part 320 can be adjusted by the intermediate member 330, the positional deviation of the back focus is controlled by controlling these fastening positions, and sufficient performance can be secured even when the usage environment covers a variety of needs stressing low temperature to high temperature. Further, in a DEOS (depth expansion optical system), the change of the depth of field due to temperature can be eased as well.

Further, by making the kernel size used at the time of the convolution operation and the coefficient used for computing the numerical value thereof variable and linking them with the kernel size and the coefficient explained above learned by input of the operation part 280 etc. and considered suitable, there are the advantages that the lenses can be designed without regard as to the magnification and defocus range, and restoration of the image by high definition convolution becomes possible.

Further, there are the advantages that a natural image can be obtained without requiring optical lenses which have a high difficulty and are expensive and large-sized and without driving the lens.

Further, the imaging device 200 according to the present embodiment can be used for an optical system of a DEOS designed considering smaller size, lighter weight, and cost in a digital camera, a camcorder, or other consumer device.

Further, the configuration of the optical system 210 can be simplified, production becomes easy, and the cost can be reduced.

When using a CCD or CMOS sensor as the imaging element, there is a resolution limit determined from the pixel pitch. When the resolution of the optical system is over that limit resolution power, the phenomenon of aliasing occurs and exerts an adverse influence upon the final image. This is a known fact.

For the improvement of the image quality, desirably the contrast is raised as much as possible, but this requires a high performance lens system.

However, as explained above, when using a CCD or CMOS sensor as the imaging element, aliasing occurs.

At present, in order to avoid the occurrence of aliasing, the imaging lens device jointly uses a low pass filter made of a uniaxial crystalline system to thereby avoid the phenomenon of aliasing.

Joint usage of the low pass filter in this way is correct in terms of principle, but a low pass filter per se is made of crystal, therefore is expensive and hard to manage. Further, there is the disadvantage that the optical system is more complicated due to its use in the optical system.

As described above, a higher definition image quality is demanded as a trend of the times. In order to form a higher definition image, the optical system in a general imaging lens device must be made more complicated. If it is complicated, production becomes difficult. Also, the utilization of expensive low pass filters leads to an increase in the cost.

However, according to the present embodiment, the occurrence of the phenomenon of aliasing can be avoided without using a low pass filter, and it becomes possible to obtain a high definition image quality.

Further, the kernel data storage ROM of FIG. 20, FIG. 21, and FIG. 22 is not necessarily used for the optical magnification, F number, size of each kernel, and value of object distance. Further, the number of prepared kernel data is not limited to three either.

Industrial Applicability

The imaging device and the method of production of the imaging device of the present invention can suppress fluctuations of plastic lenses and can suppress deterioration of performances of lenses due to expansion, so can be applied to barcode readers and other information code reading devices and various types of electronic devices.

We Claim:

1. An imaging device comprising:
an optical system having a fixed focal point which includes lenses made of glass and plastic,
an imaging element capturing an object image passed through the optical system, and
a lens frame structure holding the optical system and the imaging element and including a lens holding part holding the lenses of the optical system and an imaging element holding part for holding the imaging element,
wherein when a sum of power of plastic lenses included in the optical system is negative, a distance between a surface on the imaging element side of the last lens which is arranged at the proximate side of the imaging element side and the imaging element becomes shorter at a temperature higher than ordinary temperature and becomes longer at a temperature lower than ordinary temperature.

2. An imaging device as set forth in claim 1, wherein relative position relationships between the lenses and the imaging element due to a temperature change are adjusted by making a linear expansion coefficient of the lens holding part variable.

3. An imaging device, comprising:
an optical system having a fixed focal point which includes lenses made of glass and plastic,
an imaging element capturing an object image passed through the optical system, a lens frame structure holding the optical system and the imaging element and including a lens holding part holding the lenses of the optical system and an imaging element holding part for holding the imaging element, wherein when a sum of power of plastic lenses included in the optical system is positive, a distance between a surface on the imaging element side of the last lens which is arranged at the proximate side of the imaging element side and the imaging element becomes longer at a temperature higher than ordinary temperature and becomes shorter at a temperature lower than ordinary temperature.

4. An imaging device as set forth in claim 3, wherein relative position relationships between the lenses and the imaging element due to a temperature change are adjusted by making a linear expansion coefficient of the lens holding part variable.

5. An imaging device, comprising:
an optical system having a fixed focal point which includes lenses made of glass and plastic,
an imaging element capturing an object image passed through the optical system, and
a lens frame structure holding the optical system and the imaging element and including a lens holding part holding the lenses of the optical system and an imaging element holding part for holding the imaging element,
wherein the lens frame structure has an intermediate member with one end side which fastens the lens holding part and the other end side which fastens the imaging element holding part, and
the linear expansion coefficient of the intermediate member is smaller compared with the linear expansion coefficients of the lens holding part and the imaging element holding part.

6. An imaging device as set forth in claim 5, wherein the intermediate member and the lens holding part are fastened on the side closer to the object than the center portion in an axial direction of the lens holding part.

7. An imaging device as set forth in claim 5, wherein the power of the optical system is set so that the power of the plastic lens is smaller than the power of the glass lens and smaller than the power of the optical system.

8. An imaging device as set forth in claim 5, wherein the optical system includes at least
a first lens on the object side and
a second lens arranged closer to the imaging element side than the first lens,
the first lens is formed by a glass lens, and
the second lens is formed by a plastic lens.

9. An imaging device as set forth in claim 5, wherein in the optical system,
a first lens, a second lens, a third lens, and a fourth lens are sequentially arranged from the object side,
the first lens is formed by a glass lens, and at least the second lens among the second, third, and fourth lenses is formed by a plastic lens.

10. An imaging device, comprising:
an optical system having a fixed focal point which includes lenses made of glass and plastic,
an imaging element capturing an object image passed through the optical system, and
a lens frame structure holding the optical system and the imaging element and including a lens holding part holding the lenses of the optical system and an imaging element holding part for holding the imaging element, and
an image processing part, wherein a dispersed image of an object captured at the imaging element is an image which is not in focus on the imaging element and in which light beams having a deep depth and a blurred portion are formed, and the image processing part generates an image signal having less dispersion than the dispersed image signal of the object from the imaging element.

11. An imaging device, comprising:
an optical system having a fixed focal point which includes lenses made of glass and plastic,
an imaging element capturing an object image passed through the optical system, and
a lens frame structure holding the optical system and the imaging element and including a lens holding part holding the lenses of the optical system and an imaging element holding part for holding the imaging element,
wherein the optical system has an optical wavefront modulation function, and phases of the optical wavefront modulation function are represented by the following equation where an optical axis of the optical-system is plotted on a z-axis, and two axes orthogonal to each other are defined as x and y:

$$z = \exp\left\{i \times \left(\sum_{j=1} C_j x^m y^n\right)\right\} \quad \text{[Equation 1]}$$

where $n$ and $m$ are integers $j = \dfrac{[(m+n)^2 + m + 3n]}{2}$, $|x| \leq 1, |y| \leq 1$.

12. An information code reading device for optically reading an information code, comprising:
an optical system having a fixed focal point which includes lenses made of glass and plastic,
an imaging element capturing an object image passed through the optical system, and
a lens frame structure holding the optical system and the imaging element and including a lens holding part holding the lenses of the optical system and an imaging element holding part holding the imaging element, and
an image processing part,
wherein a dispersed image of an object captured at the imaging element is an image which is not in focus on the imaging element and in which light beams having a deep depth and a blurred portion are formed, and the image processing part generates an image signal having less dispersion than the dispersed image signal of the object from the imaging element.

13. An imaging device, comprising:
an optical system having a fixed focal point which includes lenses made of glass and plastic,
an imaging element capturing an object image passed through the optical system, and
a lens frame structure holding the optical system and the imaging element, wherein
the lens frame structure includes
a lens holding part holding lenses of the optical system,
an imaging element holding part holding the imaging element,
an intermediate member configured for fastening to the lens holding part and to the imaging element holding part, and the intermediate member defining a plurality of spaced fastening positions in an optical axis direction, whereby it is possible to select and fix positions of the lens holding part and the imaging element holding part from among a plurality of positions at different locations in an optical axis direction.

14. An imaging device as set forth in claim 13, wherein the power of the optical system is set so that the power of the plastic lens is smaller than the power of the glass lens and smaller than the power of the optical system.

15. An imaging device as set forth in claim 13, wherein the optical system includes at least
a first lens on the object side and
a second lens arranged closer to the imaging element side than the first lens,
the first lens is formed by a glass lens, and
the second lens is formed by a plastic lens.

16. An imaging device as set forth in claim 13, wherein, in the optical system,
a first lens, a second lens, a third lens, and a fourth lens are sequentially arranged from the object side,
the first lens is formed by a glass lens, and
at least the second lens among the second, third, and-fourth lenses is formed by a plastic lens.

17. An imaging device, comprising:
an optical system having a fixed focal point which includes lenses made of glass and plastic,
an imaging element capturing an object image passed through the optical system, and
a lens frame structure holding the optical system and the imaging element, wherein
a lens frame structure includes
a lens holding part holding lenses of the optical system and
an imaging element holding part holding the imaging element, and
wherein it is possible to select and fix positions of the lens holding part and the imaging element holding part from among a plurality of positions at different locations in an optical axis direction, and
wherein the back focus at ordinary temperature is not changed, but according to the temperature condition under which a lens unit including the optical system, the imaging element, and the lens frame structure is used, it is possible to select and fix the imaging element side from among the plurality of positions in a case where the back focus becomes longer than that at the time of ordinary temperature and select and fix the object side from among the plurality of positions in a case where the back focus becomes shorter than that at the time of ordinary temperature.

18. An imaging device, comprising:
an optical system having a fixed focal point which includes lenses made of glass and plastic,
an imaging element capturing an object image passed through the optical system, and
a lens frame structure holding the optical system and the imaging element, wherein
a lens frame structure includes
a lens holding part holding lenses of the optical system and
an imaging element holding part holding the imaging element, and
wherein it is possible to select and fix positions of the lens holding part and the imaging element holding part from among a plurality of positions at different locations in an optical axis direction, and
wherein when a sum of power of plastic lenses included in the optical system is negative and the back focus is shorter at a temperature higher than ordinary temperature, the object side can be selected and fastened from among the plurality of fastening positions, and when the back focus is longer at a temperature lower than ordinary temperature, the imaging element side can be selected and fastened from among the plurality of fastening positions.

19. An imaging device, comprising:
an optical system having a fixed focal point which includes lenses made of glass and plastic,
an imaging element capturing an object image passed through the optical system, and
a lens frame structure holding the optical system and the imaging element, wherein
a lens frame structure includes
a lens holding part holding lenses of the optical system and
an imaging element holding part holding the imaging element, and
wherein it is possible to select and fix positions of the lens holding part and the imaging element holding part from among a plurality of positions at different locations in an optical axis direction, and
wherein when a sum of power of plastic lenses included in the optical system is positive and the back focus is longer at a temperature higher than ordinary temperature, the imaging element side can be selected and fastened from among the plurality of fastening positions, and when the back focus is shorter at a temperature lower than ordinary temperature, the object side can be selected and fastened from among the plurality of fastening positions.

20. An imaging device, comprising:
an optical system having a fixed focal point which includes lenses made of glass and plastic,
an imaging element capturing an object image passed through the optical system,
a lens frame structure holding the optical system and the imaging element, and
an imaging processing part, wherein
a lens frame structure includes
a lens holding part holding lenses of the optical system and
an imaging element holding part holding the imaging element, and
wherein it is possible to select and fix positions of the lens holding part and the imaging element holding part from among a plurality of positions at different locations in an optical axis direction, and
wherein a dispersed image of an object captured at the imaging element is an image which is not in focus on the imaging element and in which light beams having a deep depth and a blurred portion are formed, and the image processing part generates an image signal having less dispersion than the dispersed image signal of the object from the imaging element.

21. An imaging device, comprising:
an optical system having a fixed focal point which includes lenses made of glass and plastic,
an imaging element capturing an object image passed through the optical system, and
a lens frame structure holding the optical system and the imaging element, wherein
a lens frame structure includes
a lens holding part holding lenses of the optical system and
an imaging element holding part holding the imaging element, and wherein it is possible to select and fix positions of the lens holding part and the imaging element holding part from among a plurality of positions at different locations in an optical axis direction, and wherein the optical system has an optical wavefront modulation function, and phases of the optical wavefront modulation function are represented by the following equation where an optical axis of the optical system is plotted on a z-axis, and two axes orthogonal to each other are defined as x and y:

$$z = \exp\left\{i \times \left(\sum_{j=1} C_j x^m y^n\right)\right\} \quad \text{[Equation 2]}$$

where $n$ and $m$ are integers $j = \dfrac{[(m+n)^2 + m + 3n]}{2}$, $|x| \leq 1, |y| \leq 1$.

22. An information code reading device for optically reading an information code, comprising:
an optical system having a fixed focal point which includes lenses made of glass and plastic,
an imaging element capturing an object image passed through the optical system,
a lens frame structure holding the optical system and the imaging element, and
an image processing part, wherein
the lens frame structure includes
a lens holding part holding lenses of the optical system and
an imaging element holding part holding the imaging element and
wherein it is possible to select and fix positions of the lens holding part and the imaging element holding part from among the plurality of positions at different locations in the optical axis direction, and
wherein a dispersed image of an object captured at the imaging element is an image which is not in focus on the imaging element is an image which is not in focus on the imaging element and in which light beams having a deep depth and a blurred portion are formed, and the image processing part generates an image signal having less dispersion than the dispersed image signal of the object from the imaging element.

23. A method of production of an imaging device, comprising:
a first step of setting each lens of an optical system including lenses made of glass and plastic in a lens holding part,
a second step of setting an imaging element in an imaging element holding part,
a third step of making a surface on an imaging element side of a last lens which is arranged at the proximate side of the imaging element side and a light receiving surface of the imaging element face each other, and
a fourth step of fastening the parts so that fluctuation of the position of back focus accompanying a temperature change can be relatively absorbed by selection of fastening positions or materials of the lens holding part and the imaging element holding part,
the fourth step comprising interposing an intermediate member between the lens holding part and the imaging element holding part, the linear expansion coefficient of the intermediate member being smaller than the linear expansion coefficients of the lens holding part and the imaging element holding part.

24. A method of production of an imaging device as set forth in claim 23, wherein the fastening positions of the lens holding part and the imaging element holding part are variable so that the lens unit can cope with a high temperature to a low temperature without changing the back focus at ordinary temperature.

25. A method of production of an imaging device as set forth in claim 23, wherein the power of the optical system is set so that the power of the plastic lens is smaller than the power of the glass lens and smaller than the power of the optical system.

26. A method of production of an imaging device as set forth in claim 23, wherein the optical system includes at least
a first lens on the object side and
a second lens arranged closer to the imaging element side than the first lens,
the first lens is formed by a glass lens, and the second lens is formed by a plastic lens.

27. A method of production of an imaging device as set forth in claim 23, wherein, in the optical system, the first lens is formed by a glass lens, at least the second lens among the second, third, and fourth lenses is formed by a plastic lens, and the lenses of the optical system are arranged in the lens holding part so that the order of lenses becomes the first lens, the second lens, the third lens, and the fourth lens from the object side.

28. A method of production of an imaging device, comprising:
a first step of setting each lens of an optical system including lenses made of glass and plastic in a lens holding part,
a second step of setting an imaging element in an imaging element holding part,
a third step of making a surface on an imaging element side of a last lens which is arranged at the proximate side of the imaging element side and a light receiving surface of the imaging element face each other, and
a fourth step of selectively fastening the lens holding part and the imaging element holding part at positions by which fluctuation of the position of the back focus accompanying a temperature change can be relatively absorbed,
the fourth step comprising selectively fastening the lens holding part and the imaging element holding part so that, when the sum of power of plastic lenses included in the optical system is negative, the distance between the surface on the imaging element side of the last lens which is arranged at the proximate side of the imaging element side and the imaging element becomes shorter at a temperature higher than ordinary temperature, but becomes longer at a temperature lower than ordinary temperature.

29. A method of production of an imaging device, comprising:
a first step of setting each lens of an optical system including lenses made of glass and plastic in a lens holding part,
a second step of setting an imaging element in an imaging element holding part,
a third step of making a surface on an imaging element side of a last lens which is arranged at the proximate side of the imaging element side and a light receiving surface of the imaging element face each other,
a fourth step of selectively fastening the lens holding part and the imaging element holding part at positions by which fluctuation of the position of the back focus accompanying a temperature change can be relatively absorbed, the fourth step comprising selectively fastening the lens holding part and the imaging element holding part so that, when the sum of power of plastic lenses included in the optical system is positive, the distance between the surface on the imaging element side of the last lens which is arranged at the proximate side of the imaging element side and the imaging element becomes longer at a temperature higher than ordinary temperature and becomes shorter at a temperature lower than ordinary temperature.

* * * * *